US012760571B2

(12) United States Patent
Caron et al.

(10) Patent No.: US 12,760,571 B2
(45) Date of Patent: Oct. 13, 2026

(54) LUBRICATING CARTRIDGE

(71) Applicant: MassTrio, LLC, Tenafly, NJ (US)

(72) Inventors: Gerald F. Caron, Andover, MA (US); Gregory D. Aviza, Marlborough, MA (US)

(73) Assignee: MASSTRIO, LLC, Portsmouth, NH (US)

( * ) Notice: Subject to any disclaimer, the term of this patent is extended or adjusted under 35 U.S.C. 154(b) by 0 days.

(21) Appl. No.: 18/815,780

(22) Filed: Aug. 26, 2024

(65) Prior Publication Data

US 2025/0067099 A1 Feb. 27, 2025

Related U.S. Application Data

(60) Provisional application No. 63/534,850, filed on Aug. 27, 2023.

(51) Int. Cl.
*E05D 11/02* (2006.01)

(52) U.S. Cl.
CPC ........... *E05D 11/02* (2013.01); *E05Y 2600/50* (2013.01)

(58) Field of Classification Search
CPC ....... E05D 3/02; E05D 11/0054; E05D 11/02; E05D 5/16; E05Y 2201/11; E05Y 2201/632; E05Y 2800/108; E05Y 2800/422; E05Y 2800/412; E05Y 2900/132; E05Y 2600/50
See application file for complete search history.

(56) References Cited

U.S. PATENT DOCUMENTS

| | | | | |
|---|---|---|---|---|
| 5,224,240 | A * | 7/1993 | Smith | E05D 11/0054 16/250 |
| 6,735,821 | B1 | 5/2004 | Christman, Jr. | |
| 6,883,205 | B2 * | 4/2005 | Martinez-Munoz | E05D 11/0054 16/250 |
| 7,703,577 | B1 | 4/2010 | Zach et al. | |
| D676,733 | S * | 2/2013 | Zach | D8/323 |
| 10,603,682 | B1 * | 3/2020 | Zalucki | B05B 12/32 |
| 11,220,851 | B2 * | 1/2022 | Conner, II | E05D 11/02 |
| 2015/0285435 | A1 | 10/2015 | Alghamdi | |
| 2019/0003226 | A1 * | 1/2019 | Alghamdi | E05D 11/02 |
| 2020/0078810 | A1 * | 3/2020 | Zalucki | B65D 83/303 |
| 2021/0278041 | A1 * | 9/2021 | Conner, II | F16N 31/02 |

FOREIGN PATENT DOCUMENTS

DE 196848483 U 9/1967

OTHER PUBLICATIONS

Int'l Search Report and Written Opinion in Appln. PCT/US2024/04390, mailed Dec. 23. 2024.

* cited by examiner

*Primary Examiner* — Chuck Y Mah

(57) ABSTRACT

A lubricating cartridge includes a lubrication section with a compartment for storing lubricant, and a mounting section connected to the lubrication section, designed for attachment to a door hinge or adjacent placement. The lubrication section includes one or more lubricant applicator compartments constructed to receive one or more lubricant applicators correspondingly the mounting section includes one or more mounting component compartments constructed to receive one or more mounting components, correspondingly.

24 Claims, 29 Drawing Sheets

902

1000-1

1000-2

1000-3

1900

LUBRICATING CARTRIDGE

CROSS REFERENCE TO RELATED APPLICATION

This application claims priority to, and the benefit of, U.S. Provisional Patent Application Ser. No. 63/534,850, filed Aug. 27, 2023, which is hereby incorporated by reference in its entirety.

FIELD

Example aspects described herein generally relate to lubricating methods and devices, and more particularly to a lubricating cartridge for use with hinges.

BACKGROUND

A typical door hinge consists of hinge leaves, a hinge pin, and knuckles. Some hinges may also incorporate ball bearings for enhanced functionality. Each hinge commonly comprises a pair of hinge leaves, which are flat, elongated metal plates that affix to either the door or the door frame/jamb. These hinge leaves possess knuckles, cylindrical segments that connect one hinge leaf to the other, functioning as pivotal points for the hinge's motion. The hinge pin, a cylindrical rod or pin, in conjunction with the hinge leaves, facilitates the door's swinging motion, enabling it to open and close smoothly. This hinge pin passes through the knuckles of the hinge leaves, allowing fluid rotational movement. Furthermore, these pins are often designed to be removable, simplifying the process of door removal when necessary. Certain hinges, especially those designed for heavy-duty or high-traffic doors, may incorporate ball bearings into their design.

Door hinges can squeak due to various reasons, with the most common cause being friction between the metal components. Over time, dust, dirt, and debris can accumulate within the hinge, leading to increased friction between the hinge leaves, pin, and knuckles. This friction produces the squeaking sound when the door is opened or closed.

Additionally, if the hinge is not properly lubricated, the lack of a smooth surface between the moving parts can result in squeaking. In some cases, the hinge itself may be damaged or worn out, leading to persistent squeaking.

Lubrication is an effective way to reduce friction and eliminate the noise caused by squeaky door hinges. Applying a suitable lubricant, like a silicone-based or graphite-based lubricant, to the hinge components can often solve the squeaking issue. However, lubricating door hinges manually can be a messy process. There's a high likelihood of accidentally applying the lubricant to surrounding areas, which then requires cleanup. Moreover, applying lubricant to areas other than the hinge itself can potentially stain or tarnish the finishes of the door, wall, trim, or floor.

One existing solution involves a hand tool that is manually operated. The hand tool includes a protective shield or cover that is slid over the hinge, for example, by sliding the tool along the edge of the door or frame. This shield helps to direct the lubricant onto the hinge components, reducing the chances of overspray or accidental application to surrounding areas. Existing manual solutions for lubricating door hinges can be problematic due to several reasons. There are still challenges associated with this approach.

Firstly, manually operating the tool along the edge of the door or frame can be cumbersome and time-consuming. It requires careful positioning and alignment to ensure proper coverage of the hinge components. This process may not be convenient or efficient for individuals with limited dexterity or those unfamiliar with the tool.

Secondly, while the protective shield aims to direct the lubricant precisely onto the hinge components, it doesn't eliminate the possibility of overspray or accidental application to surrounding areas. Despite the shield's presence, there is still a risk of inadvertently staining or tarnishing the door, wall, trim, or floor finishes, leading to the need for cleanup and potential damage.

While this manual approach minimizes the mess and reduces the extent of cleanup required, it still poses challenges in terms of precise application and protecting the surrounding surfaces. Therefore, although these specialized hinge lubrication tools aim to offer a cleaner solution compared to manual methods, they may not completely address the problems associated with manual operation.

SUMMARY

The example embodiments described herein meet the above-identified needs by providing methods and devices for lubricating hinges. One example aspect involves a lubricating cartridge having a lubrication section with a compartment for storing lubricant, and a mounting section connected to the lubrication section, designed for attachment to a door hinge or adjacent placement. Additionally, the lubricating cartridge may include a barrier section placed between the mounting section and the lubrication section. This barrier section is structured to prevent the transfer of lubricant to the mounting section.

Various embodiments of lubricating cartridges are described herein. The various features and embodiments described herein can stand independently or coalesce with others.

In some embodiments, a lubricating cartridge is designed with a lubrication section housing a dedicated compartment for lubricant storage. This cartridge seamlessly integrates a mounting section that aligns with a door hinge, either attaching directly or resting in close proximity.

To prevent the unintended spread of lubricant to the mounting section, certain configurations of the lubricating cartridge incorporate a barrier section between the mounting and lubrication sections. This barrier is strategically constructed and might encompass elements like wipers, sponges, or carefully positioned gaps.

In particular embodiments, the lubricating cartridge may incorporate lubricants tailored for optimal performance on door hinges. Additionally, the inclusion of a lubricant applicator streamlines the process of transporting lubricant to the contact surface of the door hinge. When the lubricant applicator is saturated and compressed against the hinge knuckles, it releases lubricant onto them. As the applicator compresses, it conforms to the curvature of the knuckles, distributing the lubricant evenly around a portion of the circumference of the knuckles.

The material utilized for the lubricant applicator is diverse, ranging from sponges and cotton to porous foams, applicator wands, felt (e.g., wool), non-woven material (e.g., non-woven fabric), and pump dispensers.

Variability extends to the composition of the casing enveloping the lubricating cartridge. Candidates include plastic, metal, elastomers, rubber, composite materials, ceramics, glass, synthetic polymers, biodegradable materials, and hybrid amalgamations.

In certain implementations, the mounting section encompasses a mounting component engineered to secure the cartridge onto a door hinge. This component presents an array of options, spanning threaded connectors, snap-fit attachments, adhesive elements, suction cups, magnets, and clamping structures. Its core function lies in attaching objects, whether temporarily or semi-permanently, to surfaces or other objects.

In some embodiments, a lubricating cartridge featuring a lubricant applicator and a mounting component installed, with the mounting component being an adhesive element. Another example involves a similar cartridge setup, while an alternative lubricant applicator configuration with a concave top surface is used.

In some embodiments, a lubricating cartridge is constructed with well compartments linked to a lubricant applicator compartment via channels.

In yet other embodiments, a lubricating cartridge equipped with a mounting section featuring shoulders is described.

In still further embodiments, a lubricating cartridge characterized by a clamp-like structure is described including a lubricating cartridge with a reservoir.

In some embodiments, the mounting component includes a hinge pin, a cylindrical rod central to hinge mechanisms, facilitating rotational movement and pivot points. Another mounting component option is a clamp designed to secure both the upper and lower sections of a hinge. An alternative approach involves a spring-loaded pin with a spring component, allowing secure attachment and easy release of the mounting component from segments of the door hinge.

In some embodiments, the mounting section incorporates an inner surface intended for secure attachment of a mounting component to the door hinge.

In some embodiments, the lubricating cartridge includes a lubricant applicator configured to transport lubricant to the door hinge's contact surface.

The design of the lubricating cartridge allows for a range of lubricant choices, encompassing liquid lubricants like silicone, grease, solid lubricants, and more complex compositions. This design facilitates versatility in lubricant selection.

In some embodiments, the barrier section of the lubricating cartridge is designed to function adaptively, acting as a hinge under certain circumstances. This adaptive hinge enhances alignment between the lubricant applicator and hinge knuckles, offering consistent lubrication application.

The lubricating cartridge's structure can, in some embodiments, incorporate collection wells, serving to manage and distribute lubricant efficiently within the cartridge. These wells act as reservoirs, retaining lubricant for application to the hinge when needed. The lubricant applicator compartment channels the collected lubricant towards the applicator, ensuring even distribution.

Depending on the cartridge's orientation, either collection well functions as a terminal point, capturing excess lubricant that hasn't been used. This design minimizes wastage and ensures efficient lubrication application.

The lubricating cartridge can feature a lubricant applicator corresponding in size to the applicator compartment, designed for controlled lubricant dispensing.

Moreover, the cartridge can include a lubricant applicator that closely matches the compartment's dimensions, ensuring a controlled release of lubricant when applied to the hinge's surface. A concave top surface further enhances controlled application.

The cartridge may also incorporate collection wells at its ends, with the applicator compartment situated between them. The lubricant applicator's length matches that of the collection wells and the compartment, and it is inserted into both ends for efficient lubricant transfer.

In some embodiments, the lubricating cartridge includes a first end collection well arranged at one end of the lubrication section and a second end collection well at the opposite end. These collection wells work in conjunction with a first end channel and a second end channel, which are positioned respectively between the collection wells and the first and second ends of the lubricant applicator compartment. The lubricant applicator, with a size matching the compartment, is inserted into the compartment.

The mounting section can comprise a first end section, a second end section, and a mounting section midsection. The step-down from the midsection to the end sections can also be described as forming "shoulders." These shoulders or step-downs play a role in preventing unintended lubricant transfer to the mounting applicator. They work alongside the barrier section.

By having the first end and second end sections stepped down from the mounting section midsection, any lubricant on the hinge or passing the barrier section is prevented from reaching the mounting applicator.

The mounting section features a mounting component affixed to the mounting section midsection, facilitating attachment to the door hinge.

In some embodiments, multiple lubricant applicators are inserted into the lubricant applicator compartment.

Additionally, the lubrication section can have a gap barrier wall.

The lubrication section might also include first and second end lubricant applicators, corresponding compartments, and a gap barrier wall.

In an example embodiment, the lubricating cartridge includes a lubrication section with one or more lubricant applicator compartments, each designed to receive a corresponding lubricant applicator. The mounting section contains one or more mounting component compartments, each constructed to receive a corresponding mounting component.

In some embodiments, the lubricant applicator compartments and the mounting component compartments are arranged in a linear alignment. Additionally, the lubricating cartridge features one or more local wells within the lubricant applicator compartments. These local wells form global wells that surround a portion of the lubricant applicators. When a lubricant applicator is inserted into its corresponding compartment, the bottom surface of the applicator rests over a local well, while the top surface extends above the compartment.

In some embodiments, on the hinge-facing side of the lubricating cartridge's main body, a trough is formed. This trough is designed to collect any lubricant that leaks outside the lubricant applicator compartments.

In some embodiments, the lubricating cartridge also includes a first and second lubricant applicator barrier. These barriers are positioned to separate the lubricant applicators and help prevent the migration of lubricant to one end of the cartridge when installed on a hinge. Additionally, one or more of the lubricant applicator barriers feature a mounting component compartment to accommodate a corresponding mounting component.

In some embodiments, the lubricating cartridge is equipped with one or more local wells formed on the main body. These wells are designed to hold adhesive material that affixes the main body of the cartridge to the bottom surface of a lubricant applicator. A well operating to contain adhesive can also be referred to as an adhesive pocket. In some embodiments, the lubricant applicator compartments are constructed to press-fit the corresponding lubricant applicator, securing it in place to prevent it from falling out.

The cartridge can include an indicator element providing visual feedback on the lubricant's presence. An example includes a transparent window containing material sensitive to lubricant presence. As lubricant is dispensed, the indicator material changes color, indicating its availability. Various visual feedback mechanisms can enhance user convenience, ensuring proper cartridge loading and readiness for lubrication.

The mounting component options encompass a capacitive coupling and an inductive coupling, enabling temporary electrical connections without physical affixation.

Lastly, a hinge-lubricating system includes any of the described lubricating cartridges and a door hinge. The mounting section is configured to allow the lubricating cartridge to be detachably and re-attachably mounted onto the door hinge.

BRIEF DESCRIPTION OF THE DRAWINGS

The features and advantages of the example embodiments of the invention presented herein will become more apparent from the detailed description set forth below when taken in conjunction with the following drawings. Non-limiting descriptions of drawing elements are provided in the attached appendix.

DETAILED DESCRIPTION

Figure 1:
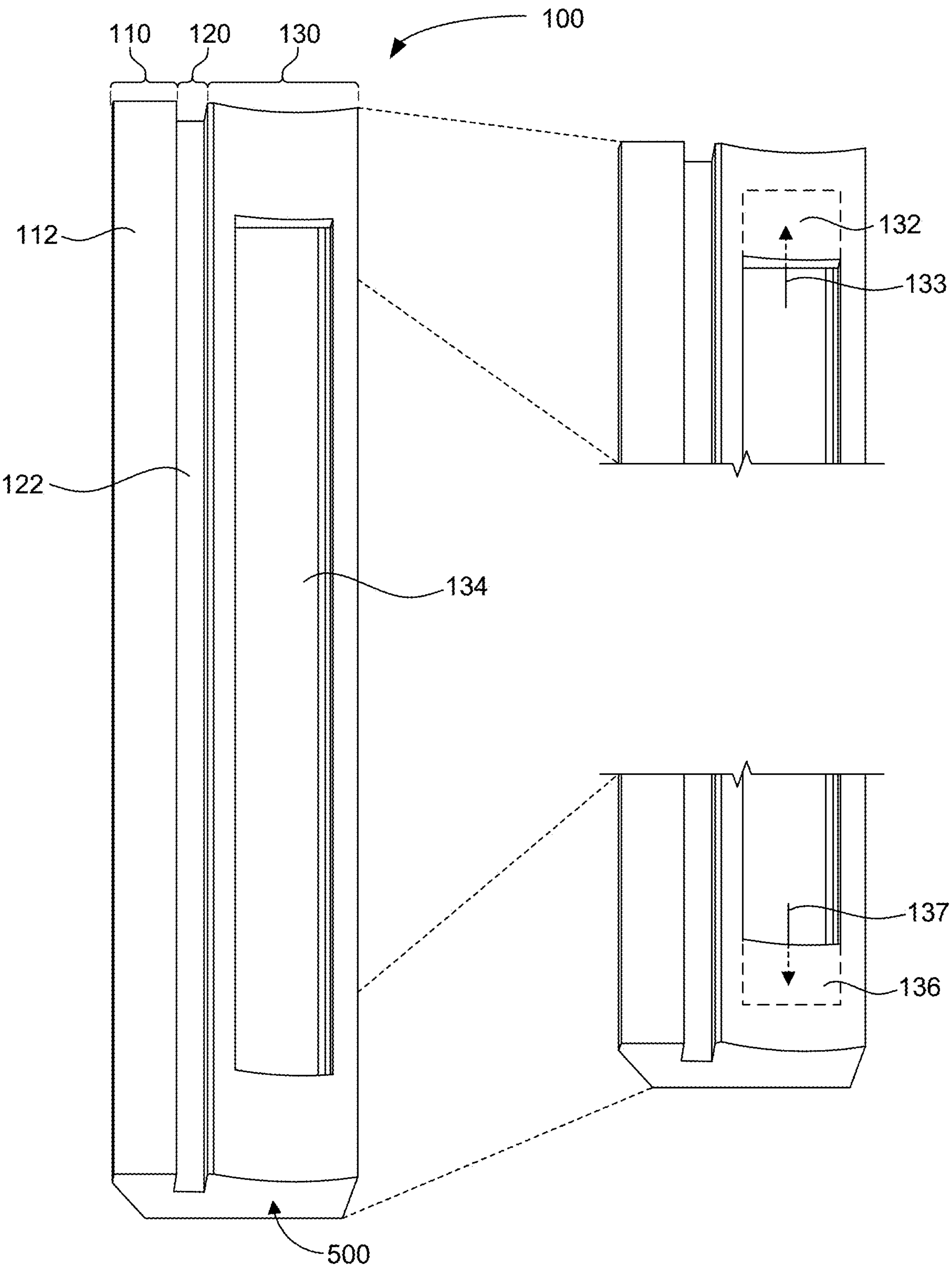
FIG. 1 is a perspective view of a lubricating cartridge, according to an example embodiment.
Figure 2:
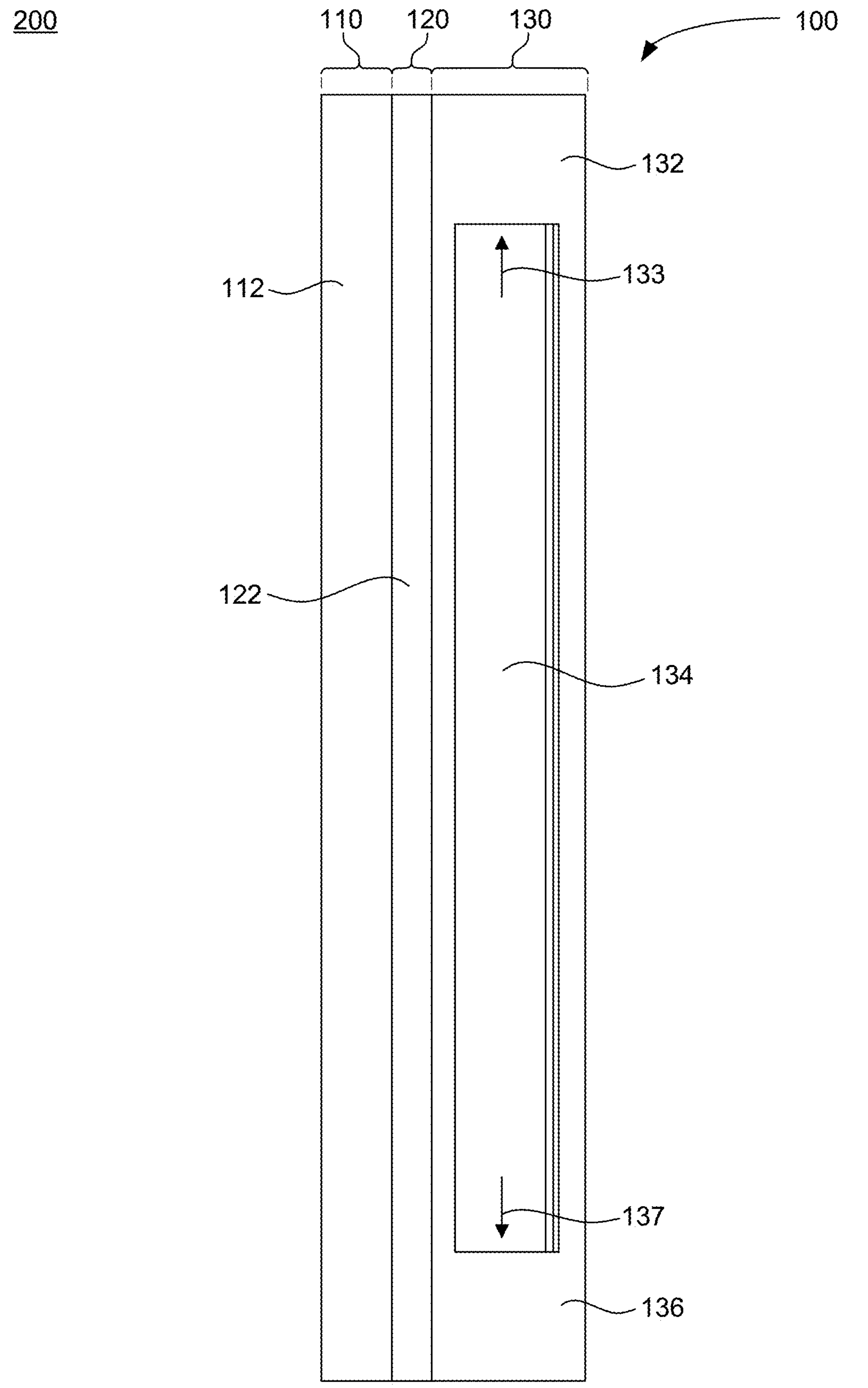
FIG. 2 is an inside view of a lubricating cartridge, according to an example embodiment.
Figure 3:
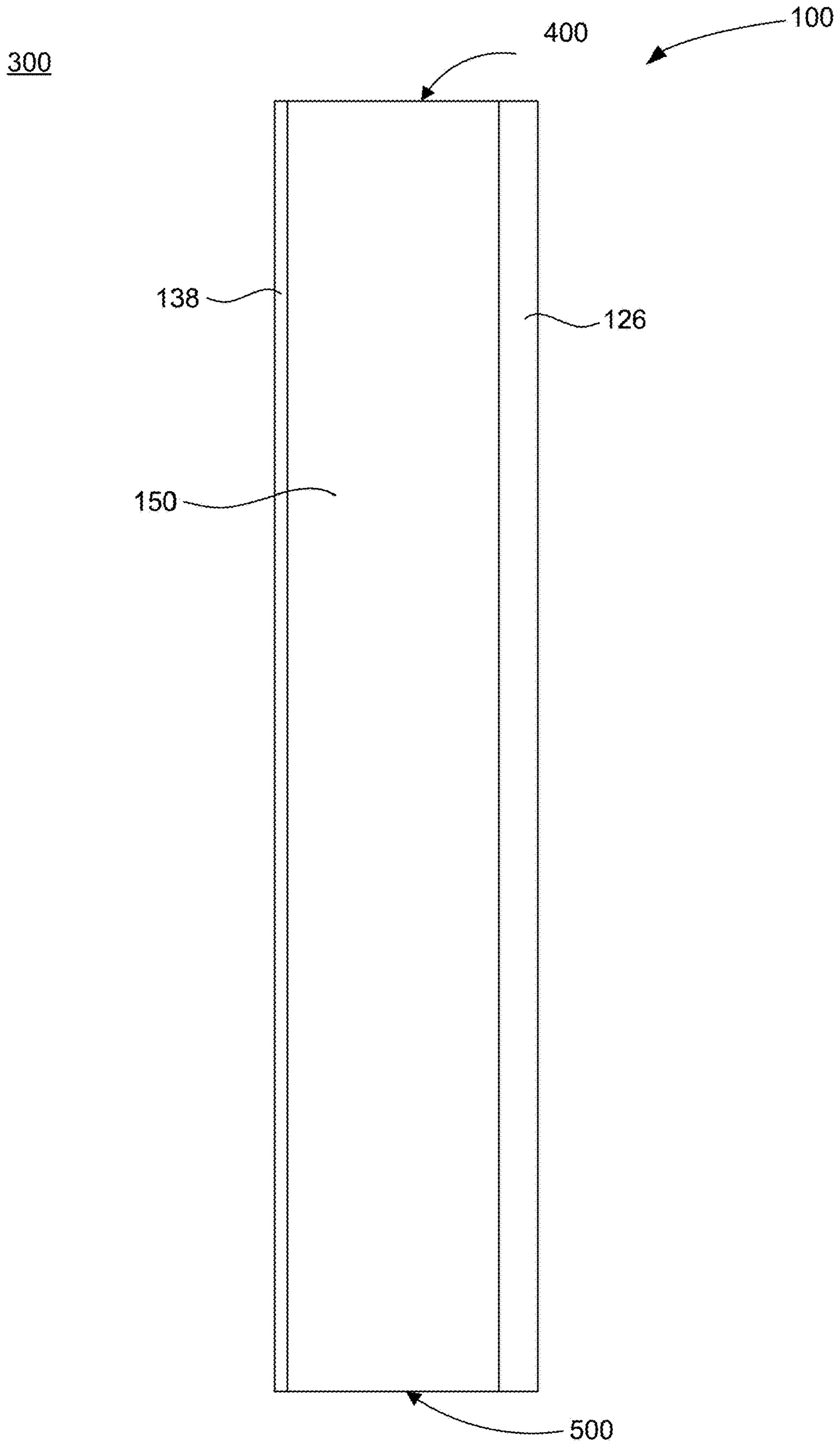
FIG. 3 is an outside view of a lubricating cartridge, according to an example embodiment.
Figure 4:
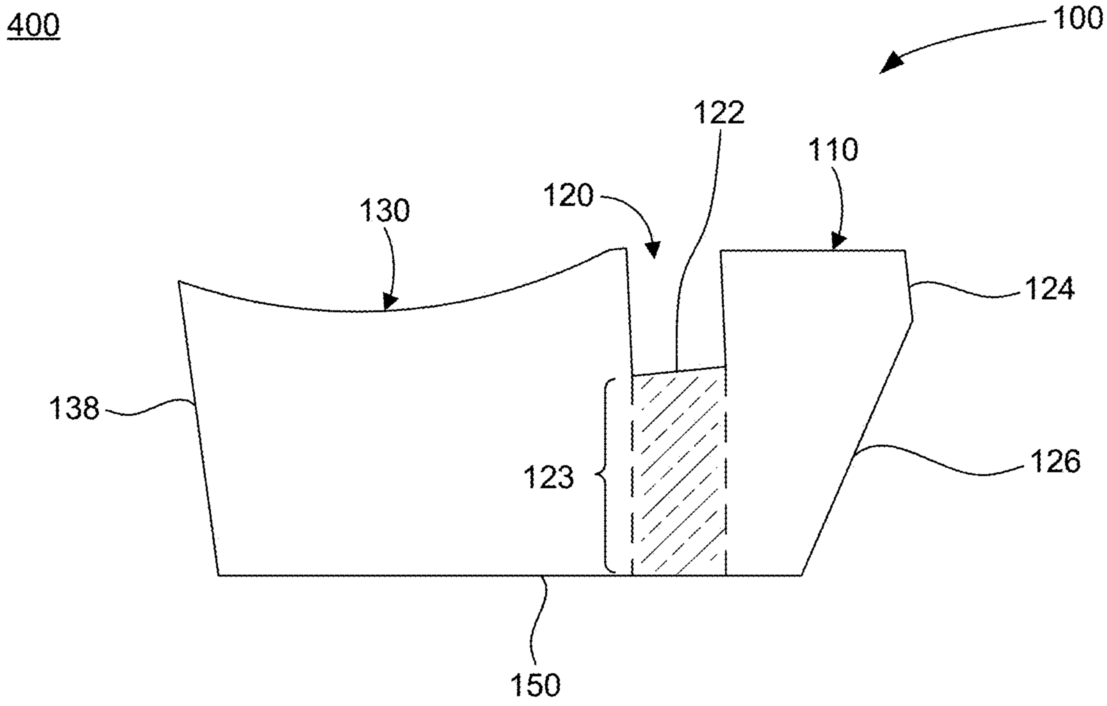
FIG. 4 is a first end view of a lubricating cartridge, according to an example embodiment.
Figure 5:
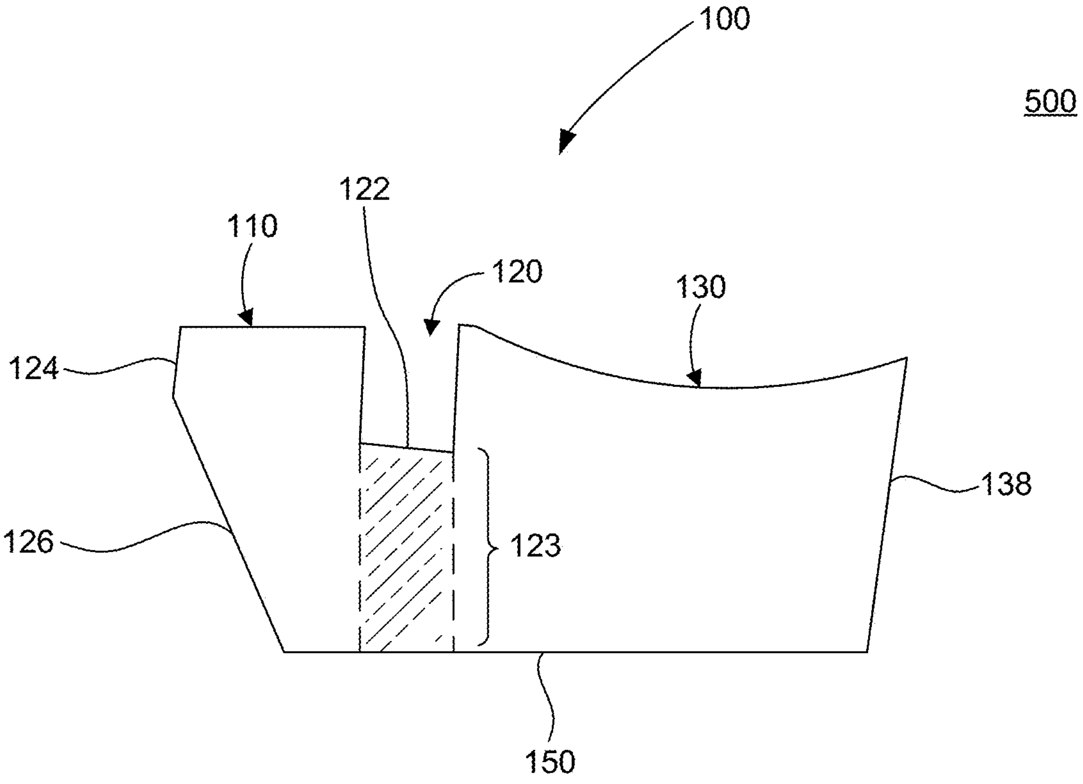
FIG. 5 is a second end view of a lubricating cartridge, according to an example embodiment.
Figure 6:
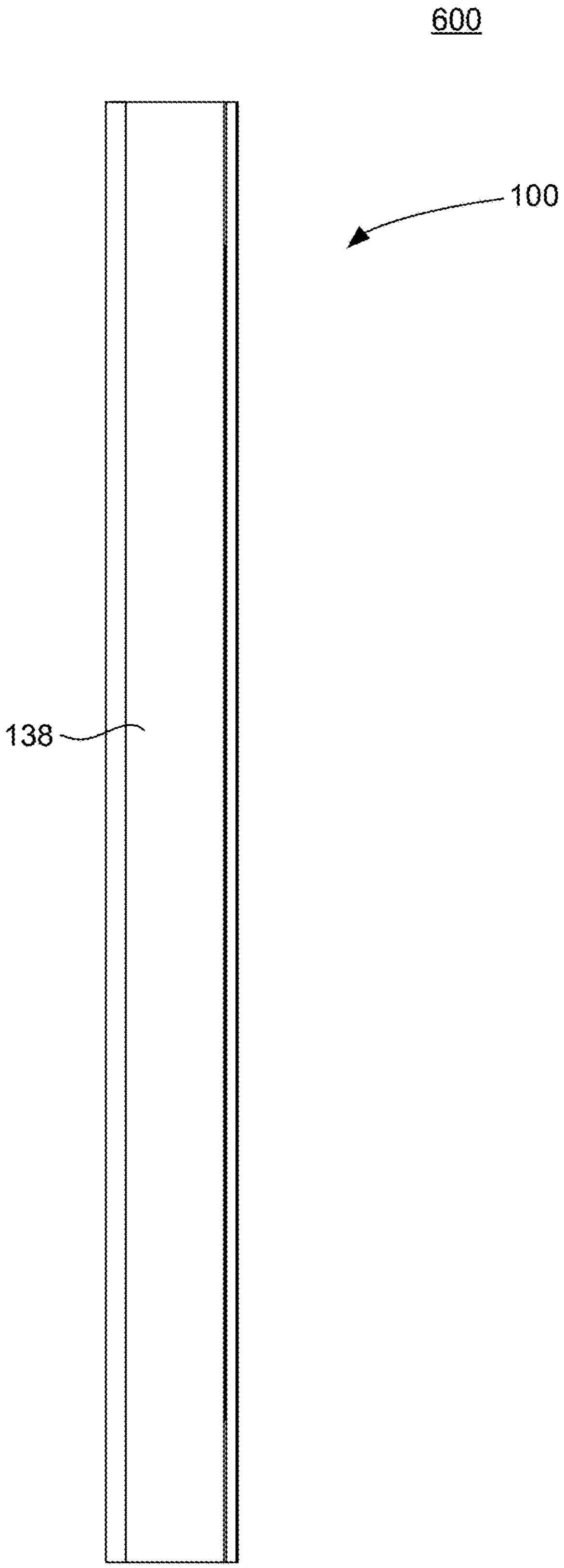
FIG. 6 is a first side view of a lubricating cartridge, according to an example embodiment.
Figure 7:
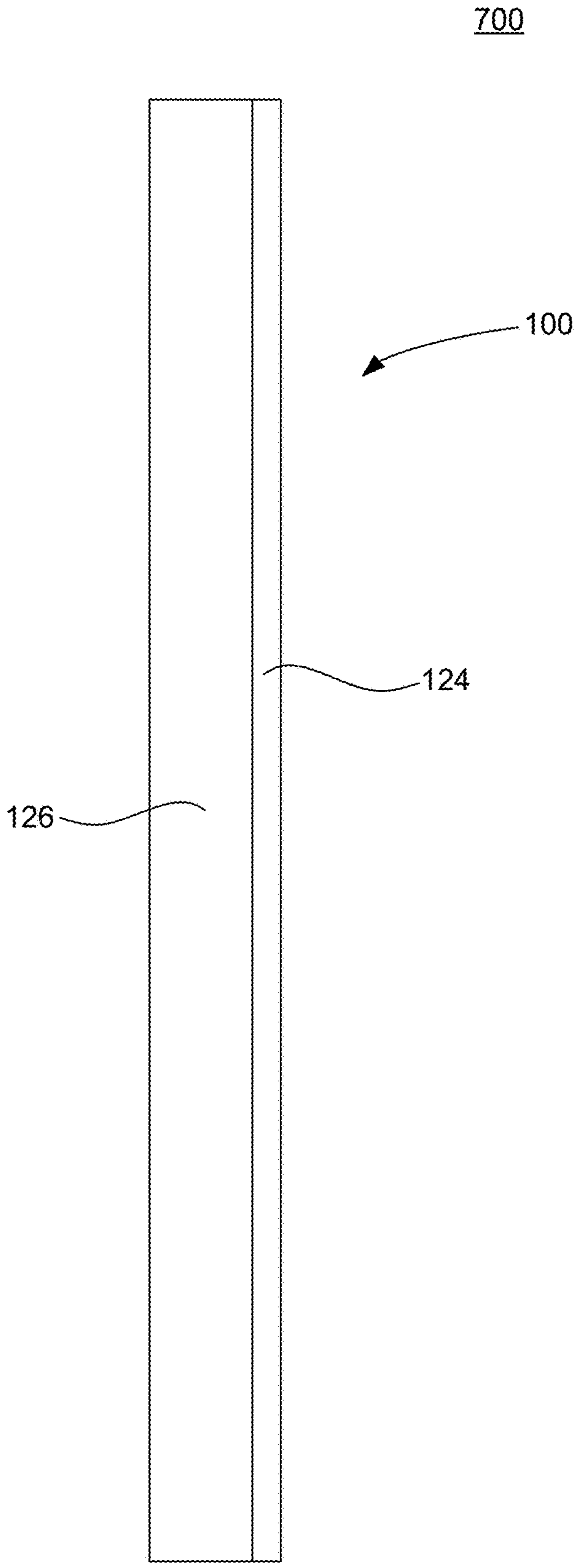
FIG. 7 is a second side view of a lubricating cartridge, according to an example embodiment.

The example embodiments of the invention presented herein are directed to lubricating methods and devices which are now described herein in terms of an example lubricating cartridge for use with a door hinge. This description is not intended to limit the application of the example embodiments presented herein. In fact, after reading the following description, it will be apparent to one skilled in the relevant art(s) how to implement the following example embodiments in alternative embodiments (e.g., involving any type of hinge such as a cabinet hinge.

It will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. Also, when introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Figure 11:
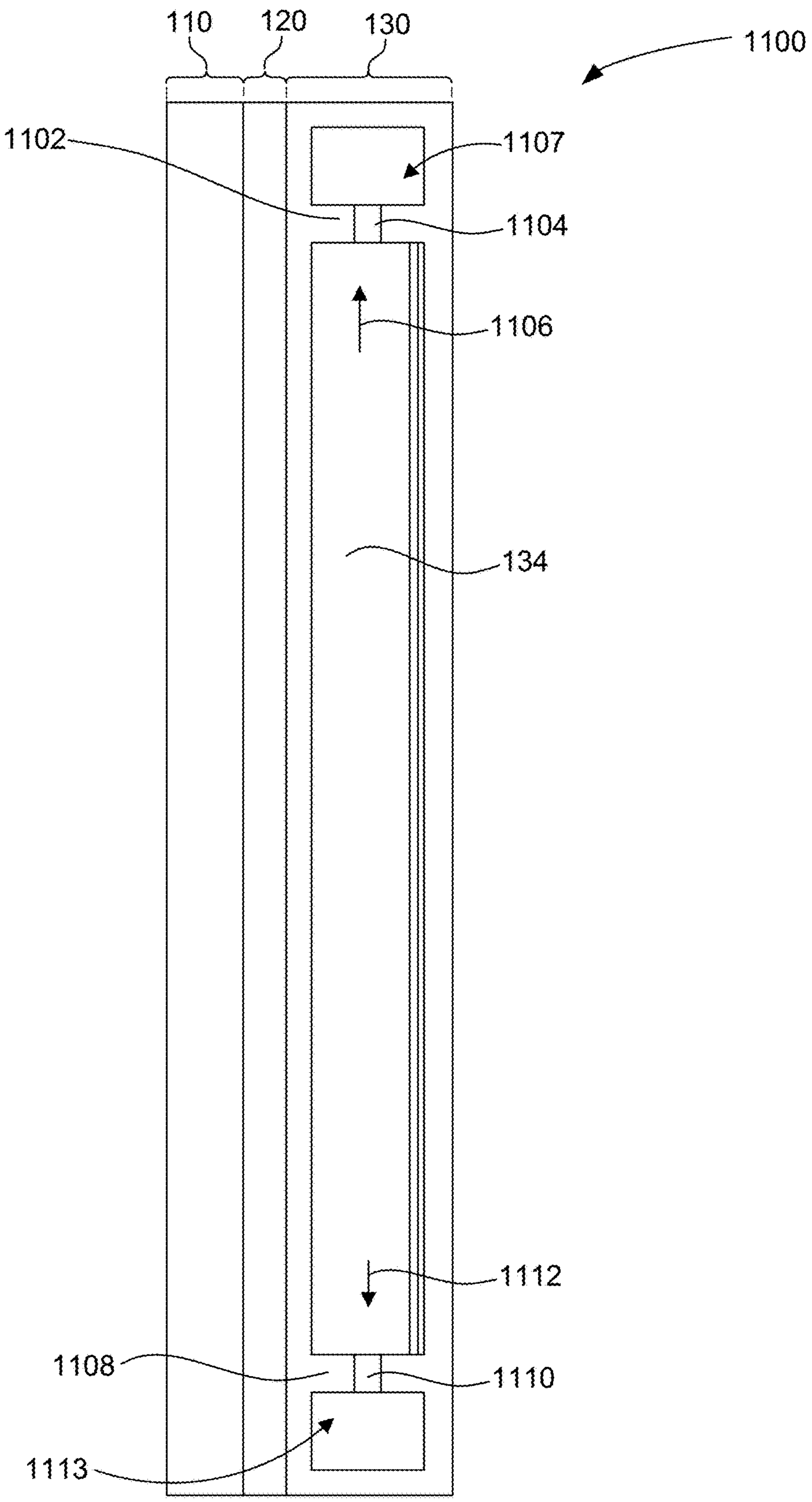
FIG. 11 is an inside view of a lubricating cartridge having well compartments fluidly coupled to a lubricant applicator compartment via channels, according to an example embodiment.
Figure 12:
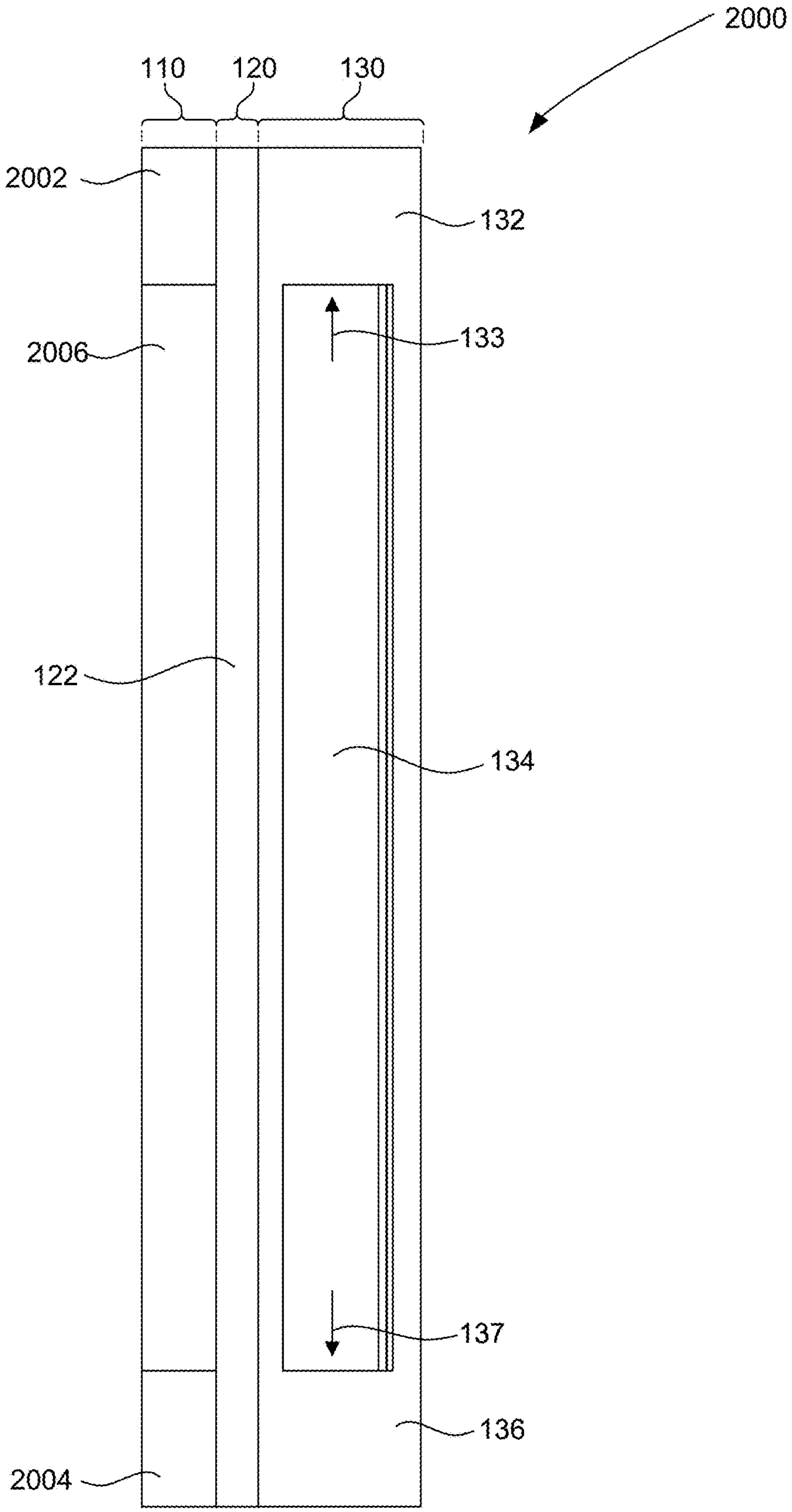
FIG. 12 is an inside view of a lubricating cartridge having a mounting section with shoulders, according to an example embodiment.
Figure 13:
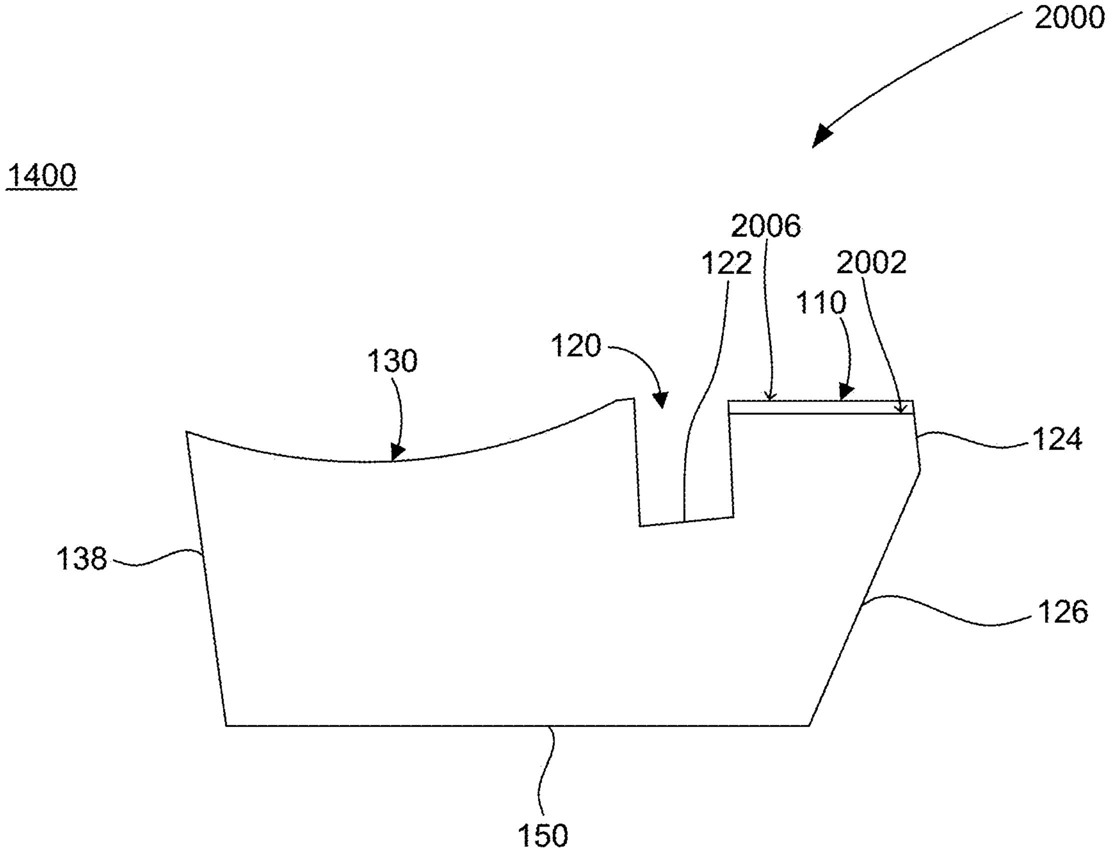
FIG. 13 is a first end view of a lubricating cartridge having a mounting section with shoulders, according to an example embodiment.
Figure 14:
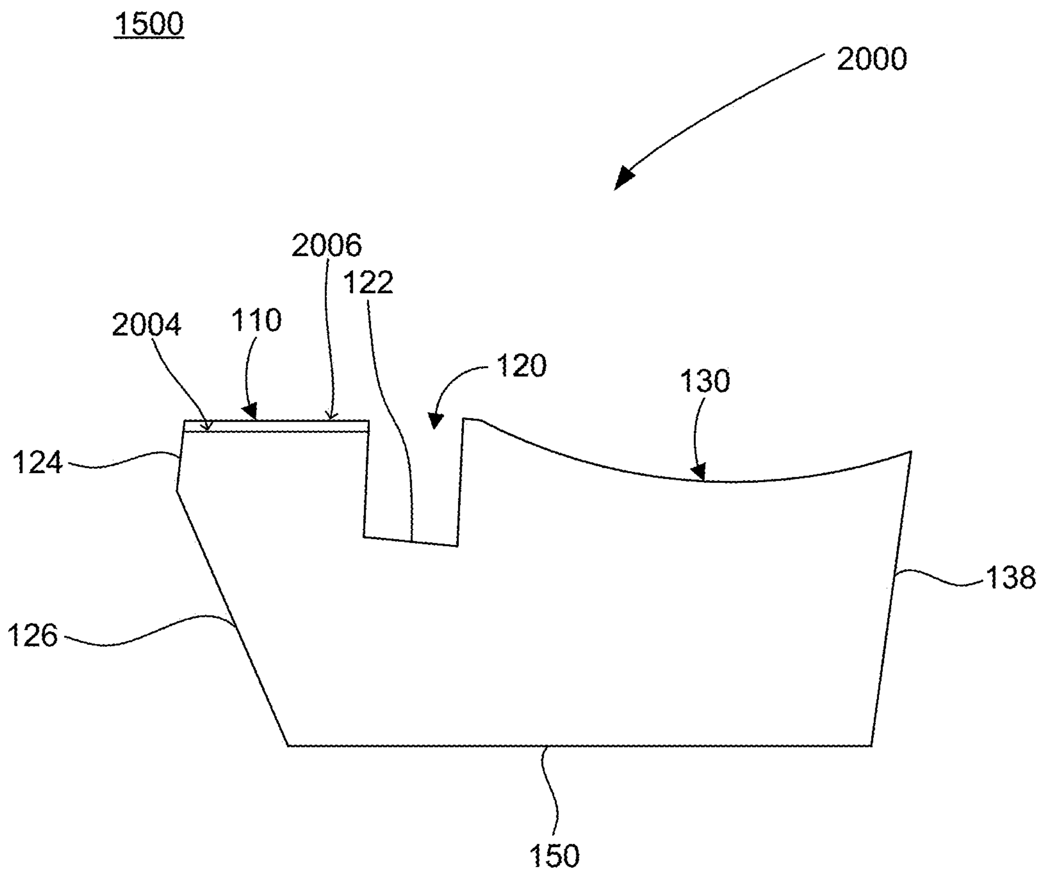
FIG. 14 is a second end view of a lubricating cartridge having a mounting section with shoulders, according to an example embodiment.
Figure 15:
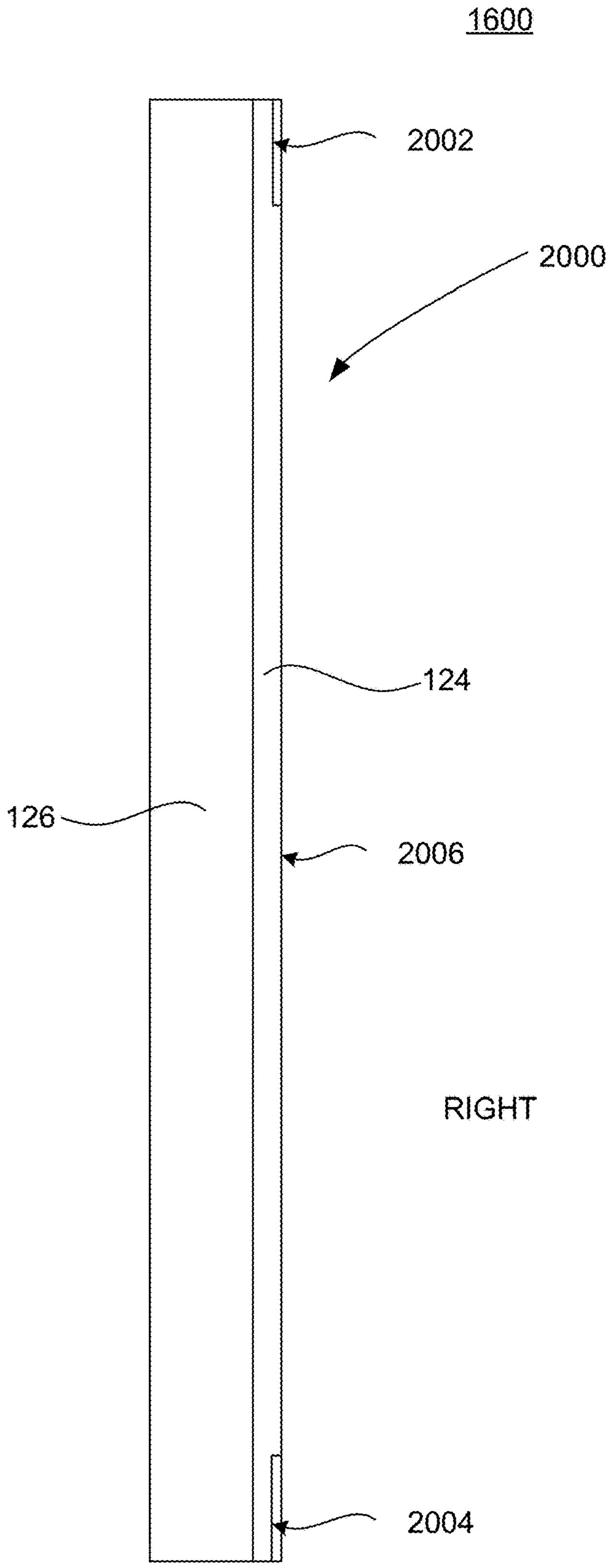
FIG. 15 is a second side view of a lubricating cartridge having a mounting section with shoulders, according to an example embodiment.
Figure 17:
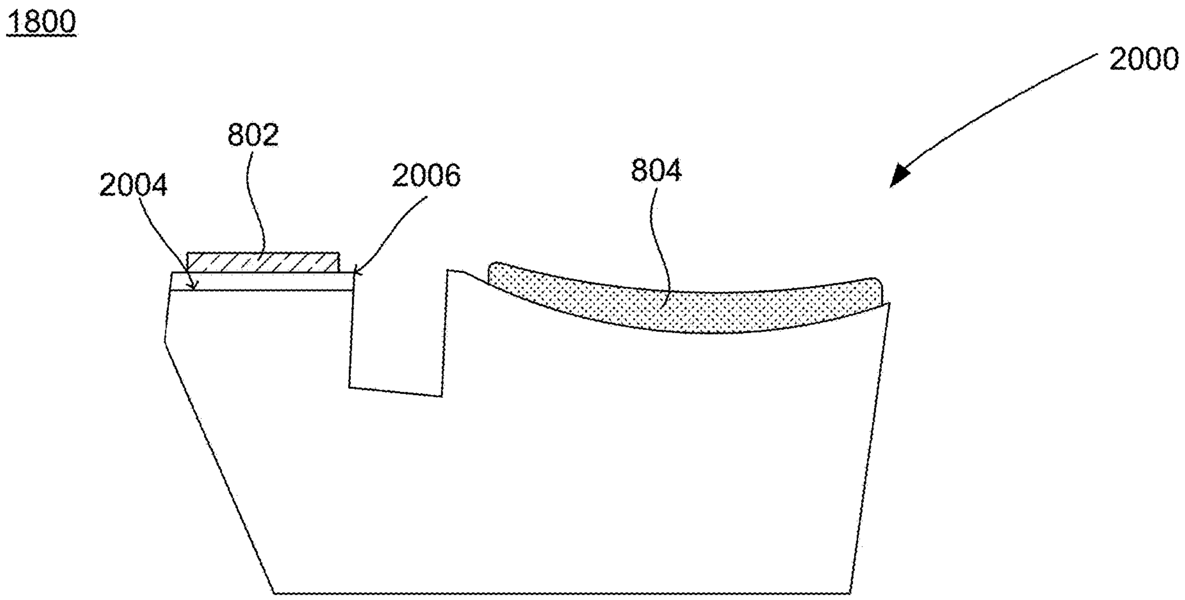
FIG. 17 is a back view of a lubricating cartridge having a mounting section with shoulders, and showing a lubricant applicator and a mounting component installed thereto, according to an example embodiment.
Figure 18:
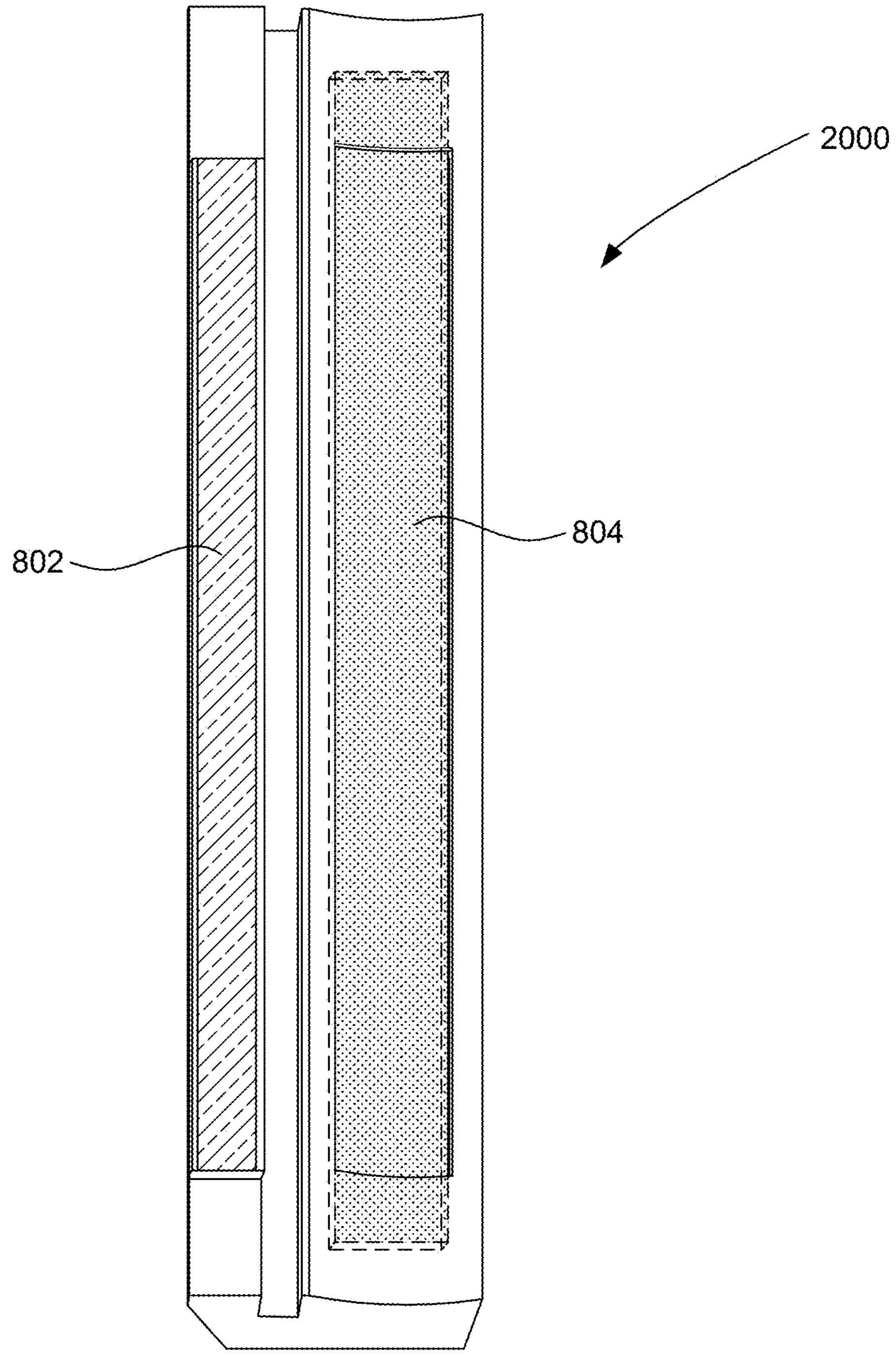
FIG. 18 is a perspective view of a lubricating cartridge having a mounting section with shoulders, and showing a lubricant applicator and a mounting component installed thereto, according to an example embodiment.
Figure 19:
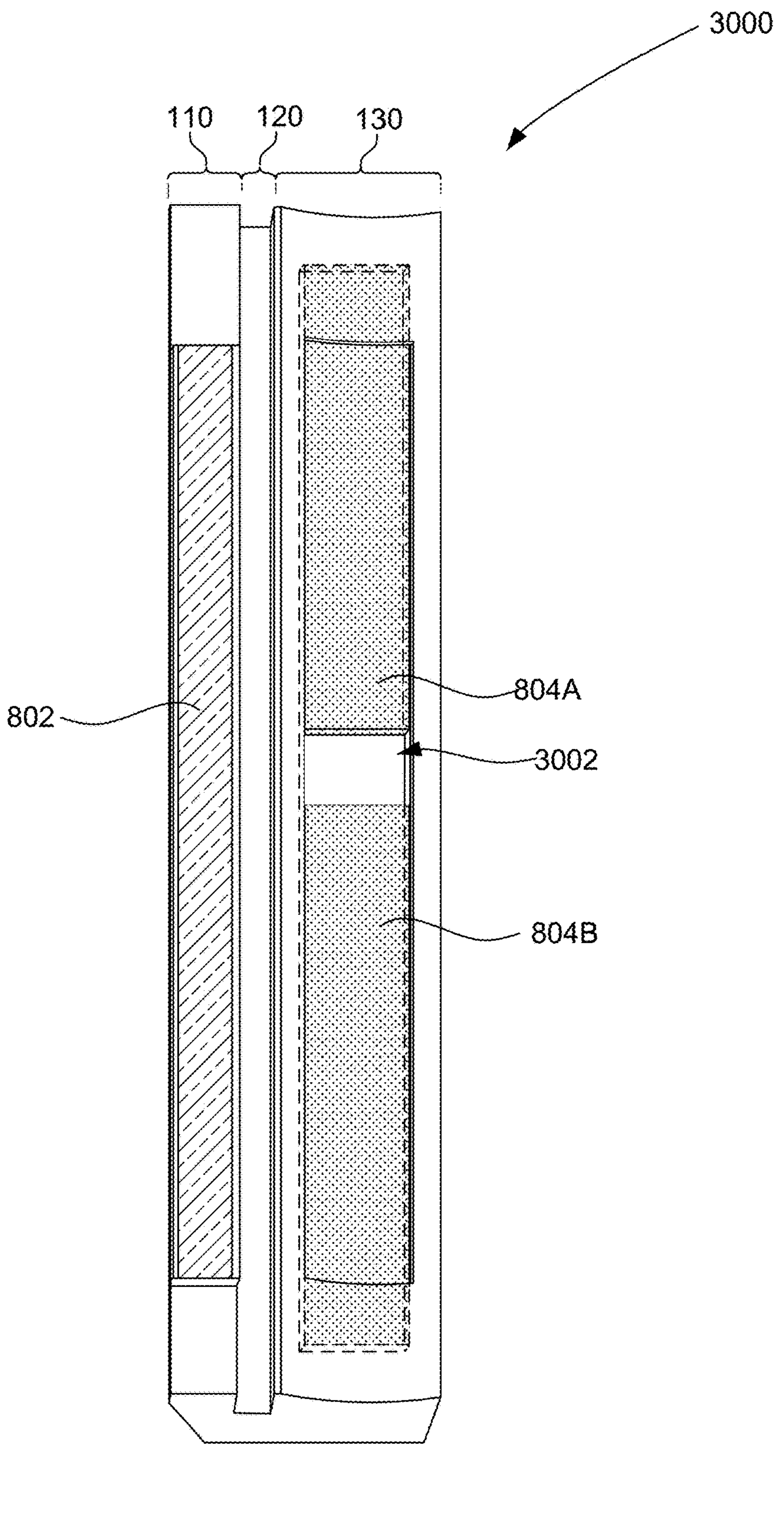
FIG. 19 is a perspective view of a lubricating cartridge having a mounting section with shoulders, and showing plural lubricant applicators and a mounting component installed thereto, according to an example embodiment.
Figure 20:
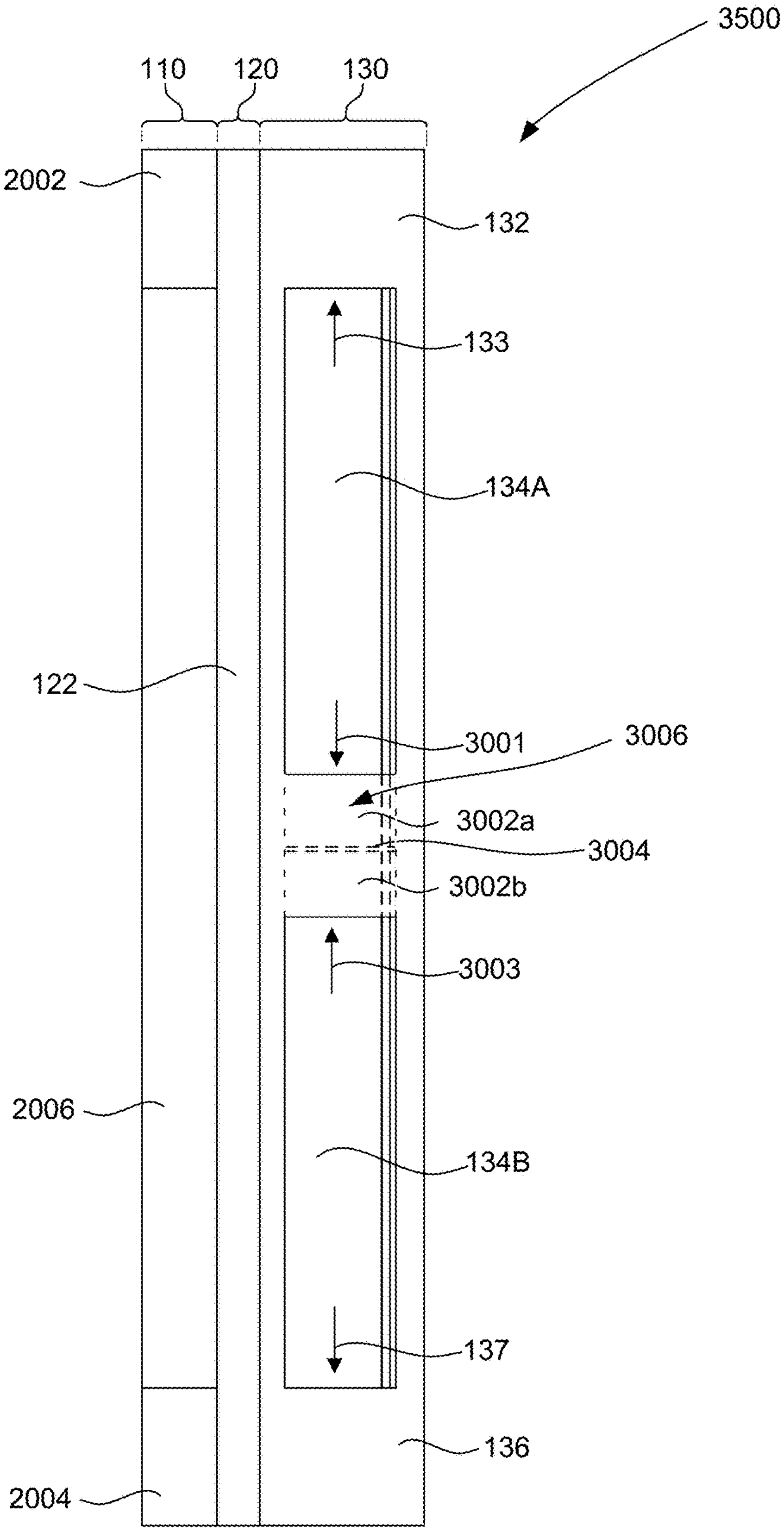
FIG. 20 is an inside view of a lubricating cartridge having a mounting section with shoulders and a lubrication section having a gap barrier wall, according to an example embodiment.
Figure 21:
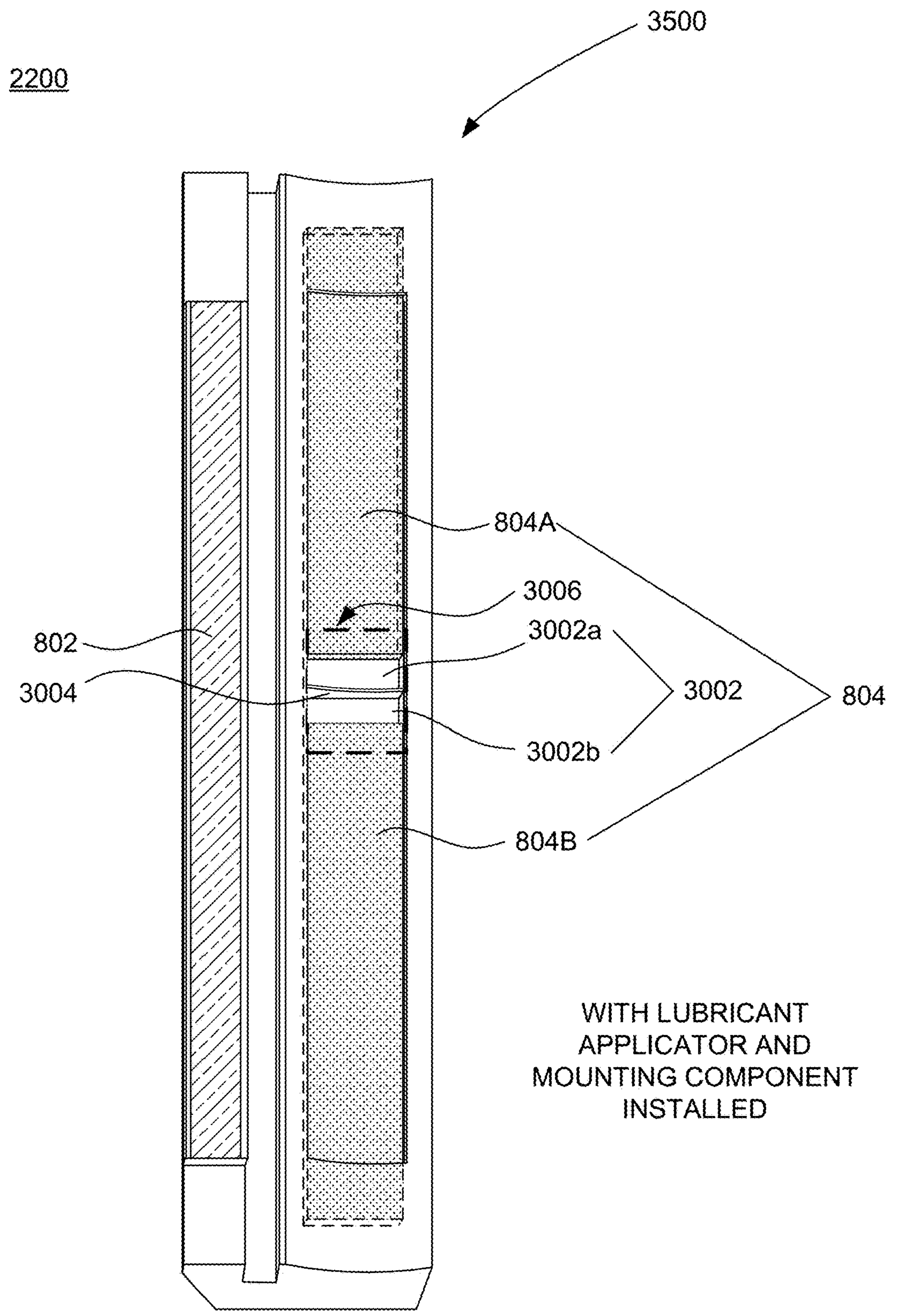
FIG. 21 is a perspective view of a lubricating cartridge having a mounting section with shoulders and a lubrication section having a gap barrier wall, and showing plural lubricant applicators and a mounting component installed thereto, according to an example embodiment.
Figure 22:
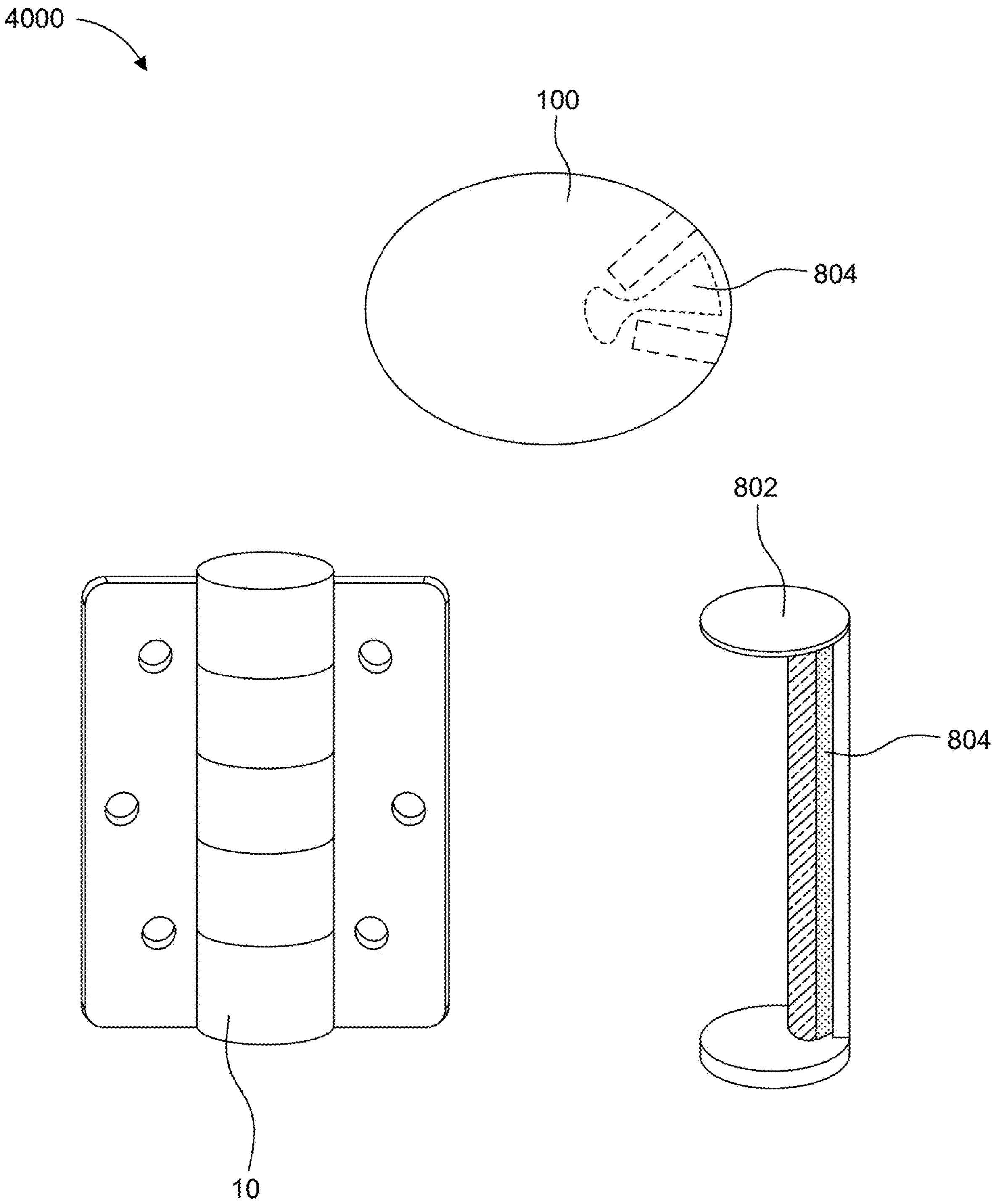
FIG. 22 is a lubricating cartridge having a clamp-like structure according to an example embodiment.
Figure 23:
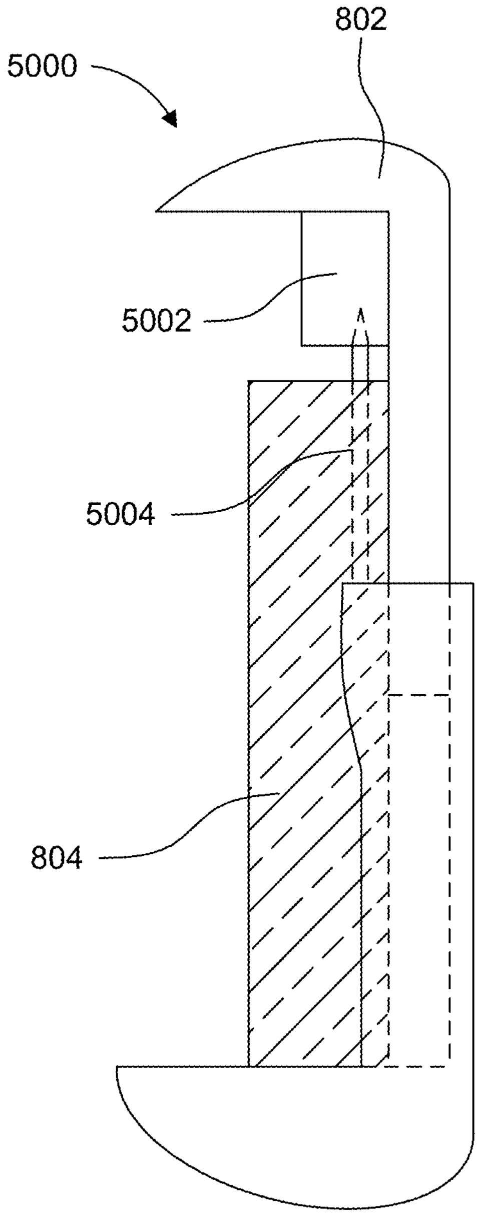
FIG. 23 is a lubricating cartridge having a reservoir according to an example embodiment.
Figure 24:
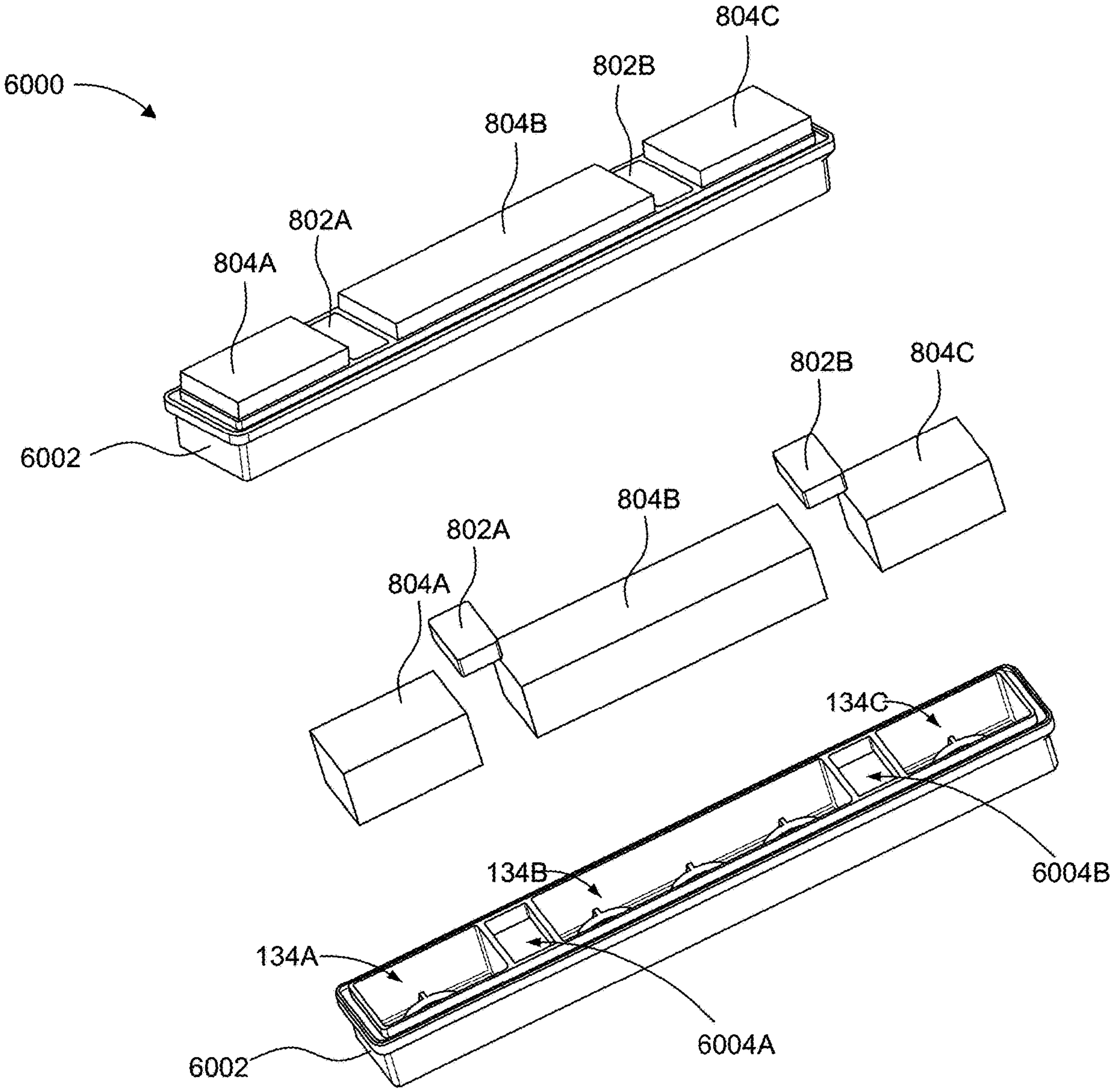
FIG. 24 is a perspective view and assembly view of a lubricating cartridge having lubricant applicator compartments and mounting component compartments configured in a linear alignment according to an example embodiment.
Figure 25:
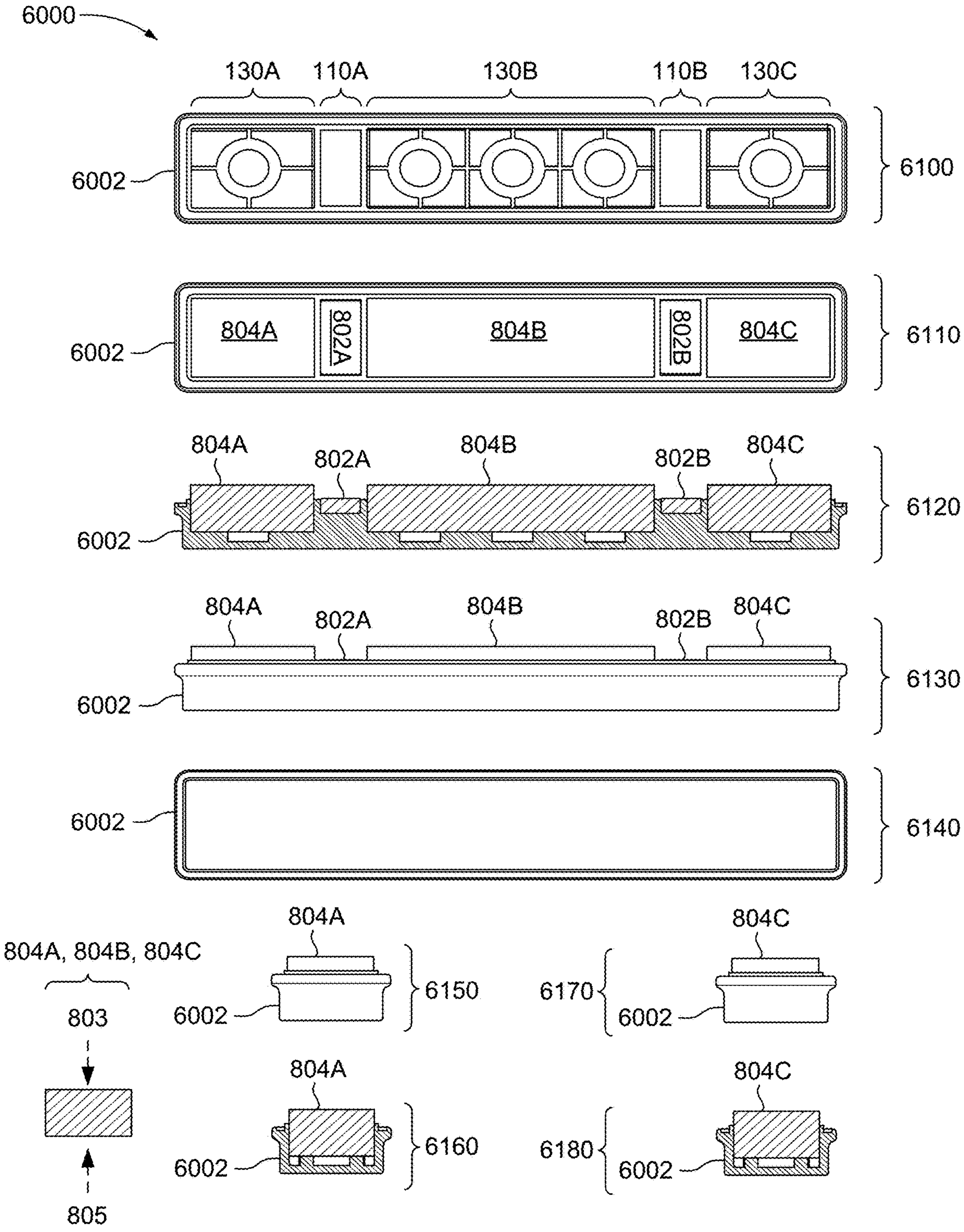
FIG. 25 are various views of a lubricating cartridge having lubricant applicator compartments and mounting component compartments configured in a linear alignment according to an example embodiment.
Figure 26:
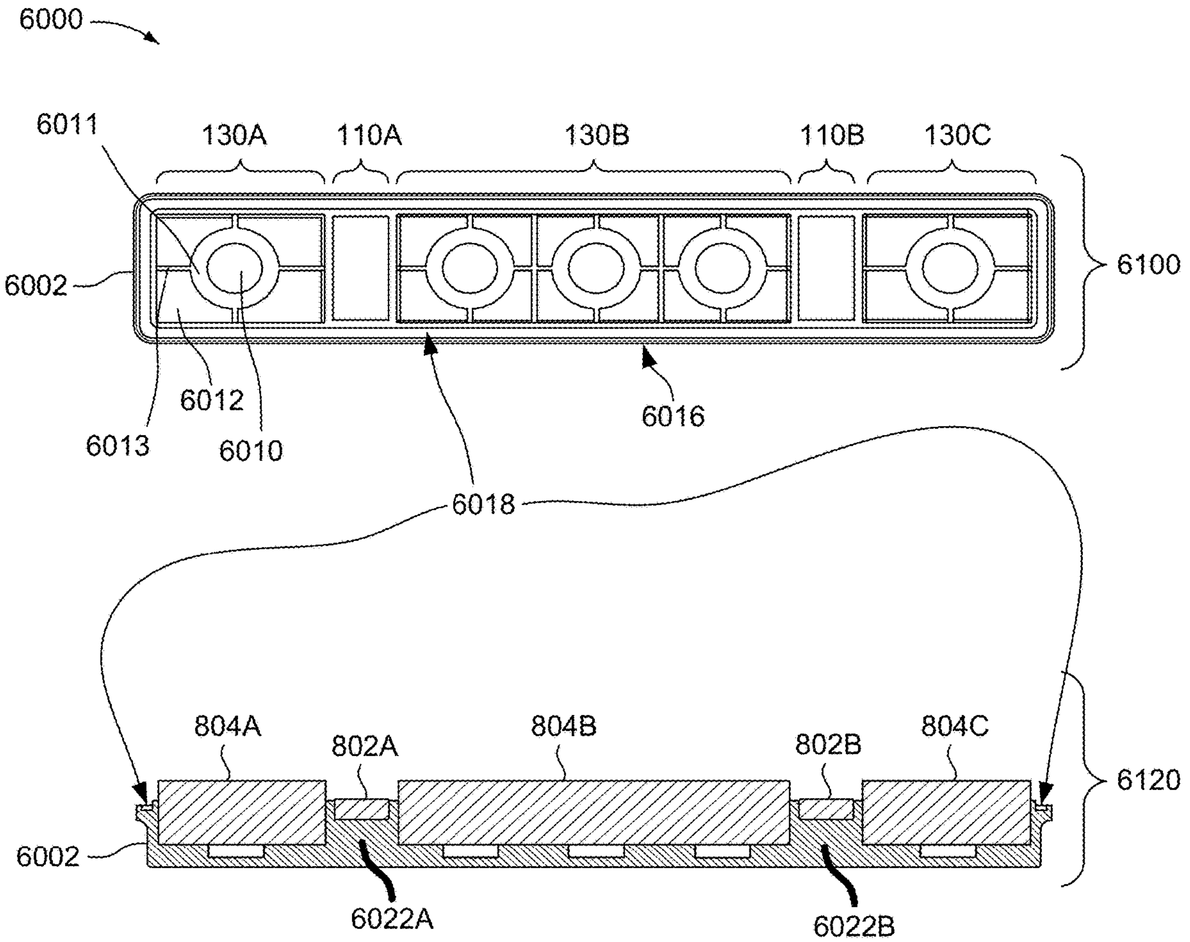
FIG. 26 illustrates various features of a lubricating cartridge having lubricant applicator compartments and mounting component compartments configured in a linear alignment according to an example embodiment.

FIG. 1, FIG. 2, FIG. 3, FIG. 4, FIG. 5. FIG. 6, FIG. 7, FIG. 8, FIG. 9A and FIG. 9B illustrate one embodiment of a lubricating cartridge (100). FIG. 11 illustrates another embodiment of a lubricating cartridge (1100). FIG. 12, FIG. 13, FIG. 14. FIG. 15, FIG. 16, FIG. 17, and FIG. 18 illustrate another embodiment of a lubricating cartridge (2000). FIG. 19 illustrates another embodiment of a lubricating cartridge (3000). FIG. 20 and FIG. 21 illustrate another embodiment of a lubricating cartridge (3500). FIG. 22 illustrates another embodiment of a lubricating cartridge (4000) having a clamp-like structure. FIG. 23 illustrates another embodiment of a lubricating cartridge (5000) having a clamp-like structure and a reservoir. FIG. 24, FIG. 25 and FIG. 26 illustrate another embodiment of a lubricating cartridge (6000). It should be understood that any of the concepts and implementations described can be used alone or in combination with any or all of the other described concepts. Thus, although various embodiments are disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the teachings herein.

In some embodiments, a lubricating cartridge (e.g., FIG. 1, 100; FIG. 11, 1100; FIG. 12, 2000; FIG. 19, 3000; FIG. 20, 3500; FIG. 22, 4000; FIG. 23, 5000; FIG. 24, 6000) is constructed to have a lubrication section (130) that includes a compartment for containing a lubricant. Additionally, it includes a mounting section (110) coupled with the lubrication section (130), which is constructed to mount onto a door hinge. Alternatively, the mounting section (110) can be positioned adjacent to a door hinge.

In some embodiments, the lubricating cartridge (e.g., FIG. 1, 100; FIG. 11, 1100; FIG. 12, 2000; FIG. 19, 3000; FIG. 20, 3500) includes a barrier section (120) positioned between the mounting section (110) and the lubrication section (130). Barrier section (120) is constructed to inhibit the transfer of lubricant to the mounting section (110). This barrier section (120) could include various components, such as a wiper, a sponge, or a specifically positioned gap between the mounting section (110) and the lubrication section (130).

In some embodiments, the lubricating cartridge (e.g., FIG. 1, 100; FIG. 11, 1100; FIG. 12, 2000; FIG. 19, 3000; FIG. 20, 3500; FIG. 22, 4000; FIG. 23, 5000; FIG. 24, 6000) may incorporate a lubricant specially formulated to provide effective lubrication for the door hinge. In some embodiments, the lubricating cartridge (e.g., FIG. 1, 100; FIG. 11, 1100; FIG. 12, 2000;

FIG. 19, 3000; FIG. 20, 3500; FIG. 22, 4000; FIG. 23, 5000; FIG. 24, 6000) may include a lubricant applicator (804) constructed to facilitate the transportation of lubricant onto the contact surface of the door hinge.

There are many different materials that can be used as the lubricant applicator (804). Some common examples include, a sponge material, cotton, a porous foam, an applicator wand, felt (e.g., wool), non-woven material (e.g., non-woven fabric), a pump dispenser, and the like. In some embodiments, the lubricant applicator (804) is made from a sponge material that is absorbent and can hold the lubricant. In some embodiments, the lubricant applicator is made from cotton. In some embodiments, the lubricant applicator is made from a porous foam that is absorbent and can hold the lubricant. In some embodiments, the lubricant applicator is an applicator wand that is specifically constructed to apply lubricant. For example, the applicator want can be made of plastic or rubber and have a pointed tip that makes it easy to apply the lubricant to a specific area. In other embodiments, the lubricant applicator is made of felt (e.g., wool). In other embodiments, the lubricant applicator is made of a non-woven material (e.g., non-woven fabric). In yet other embodiments, the lubricant applicator is a pump dispenser configured to apply the lubricant.

The materials that can constitute the casing of the lubricating cartridge (e.g., FIG. 1, 100; FIG. 11, 1100; FIG. 12, 2000; FIG. 19, 3000; FIG. 20, 3500; FIG. 22, 4000; FIG. 23, 5000;

FIG. 24, 6000) include plastic, metal, and various others. For instance, rubber or elastomers could be chosen when flexibility and durability are vital, ensuring the cartridge can adeptly endure movement and varying environmental conditions. In specific instances, the casing of the lubricating cartridge can be formed from composite materials, utilizing a blend of different materials. Moreover, ceramics stand as another potential material, with resistance to high temperatures and wear in mind.

Glass, as an alternative, might be employed in cases where transparency or distinct chemical resistance properties are sought. Synthetic polymers present yet another avenue, and their advanced variations can incorporate specific traits like high-temperature resilience or self-lubrication. Furthermore, the casing of the lubricating cartridge could be formed from biodegradable materials, aligning with ecological considerations that emphasize sustainability.

Lastly, hybrids in the form of material combinations, such as metal fused with plastic, can be explored to capitalize on the individual strengths of each constituent. Ultimately, the selection of material hinges on factors such as the cartridge's intended use, the desired robustness, environmental conditions, and cost-effectiveness, all of which can be harmonized with the cartridge's design for optimal performance and longevity.

In some embodiments, the mounting section (110) of the lubricating cartridge (e.g., FIG. 1, 100; FIG. 11, 1100; FIG. 12, 2000; FIG. 19, 3000; FIG. 20, 3500; FIG. 22, 4000; FIG. 23, 5000; FIG. 24, 6000) features a mounting component (802) intended for secure attachment onto the door hinge. This mounting component (802) can vary and may encompass options such as one or more threaded connectors, one or more snap-fit attachments, one or more adhesive elements, one or more suction cups, one or more magnets, and one or more clamping structures. A "mounting component" as used herein, generally means one or more parts that is used to mount an object to another object or to a surface. In some embodiments, the mounting component is used to create a temporary attachment between the two objects. In some embodiments, the mounting component is used to create a semi-permanent attachment between the two objects.

Figure 8:
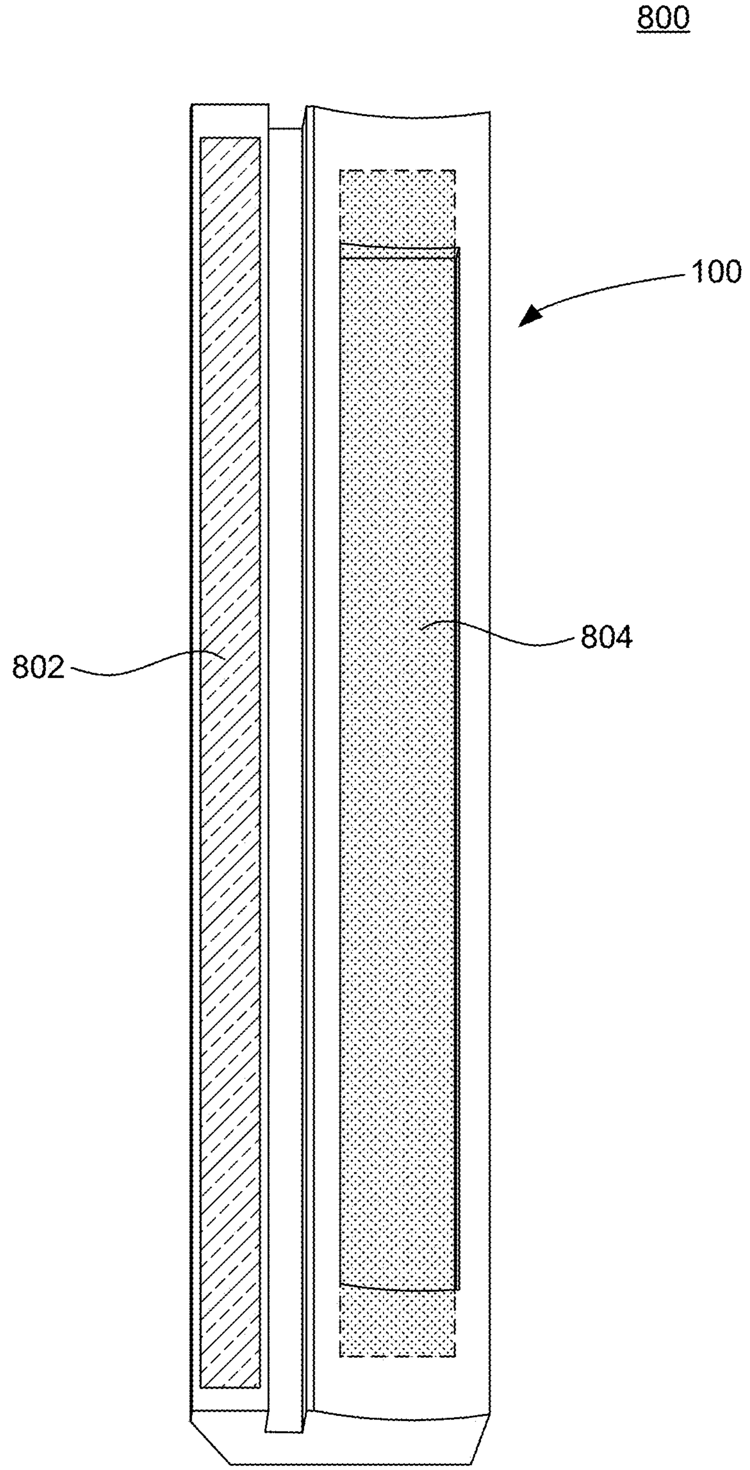
FIG. 8 is a perspective view of a lubricating cartridge showing a lubricant applicator and a mounting component installed thereto, according to an example embodiment.
Figure 9A:
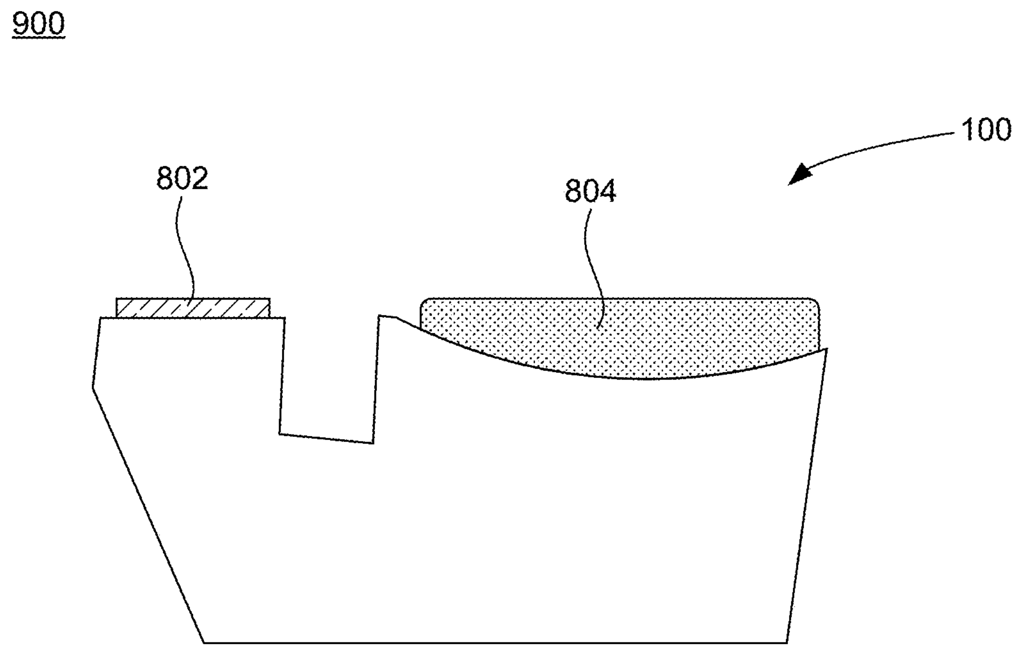
FIG. 9A is a second end view of a lubricating cartridge showing a lubricant applicator and a mounting component installed thereto, according to an example embodiment.
Figure 9B:
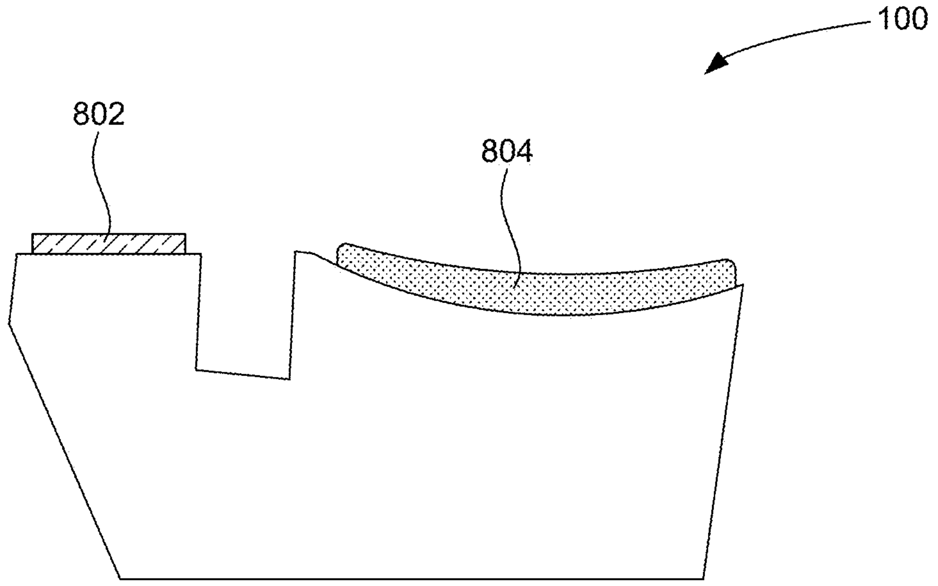
FIG. 9B is a second end view of a lubricating cartridge showing a lubricant applicator and a mounting component installed thereto, according to an example embodiment.

FIG. 8, for example, illustrates a lubricating cartridge (100) showing a lubricant applicator (804) and a mounting component (802) installed thereto, according to an example embodiment. In this embodiment the mounting component (802) is an adhesive element. FIG. 9A is a second end view of a lubricating cartridge (100) showing a lubricant applicator (804) and a mounting component (802) installed thereto, according to an example embodiment. FIG. 9B is a second end view of a lubricating cartridge (100) showing an alternative lubricant applicator (804) and a mounting component (802) installed thereto, where the lubricant applicator (804) has a top surface and a bottom surface, and the top surface is concave.

FIG. 11 is an inside view of another example embodiment of a lubricating cartridge (1100). In this example, the lubricating cartridge (1100) has well compartments fluidly coupled to a lubricant applicator (not shown) compartment via channels (e.g., first end channel 1104, second end channel 1110).

Figure 16:
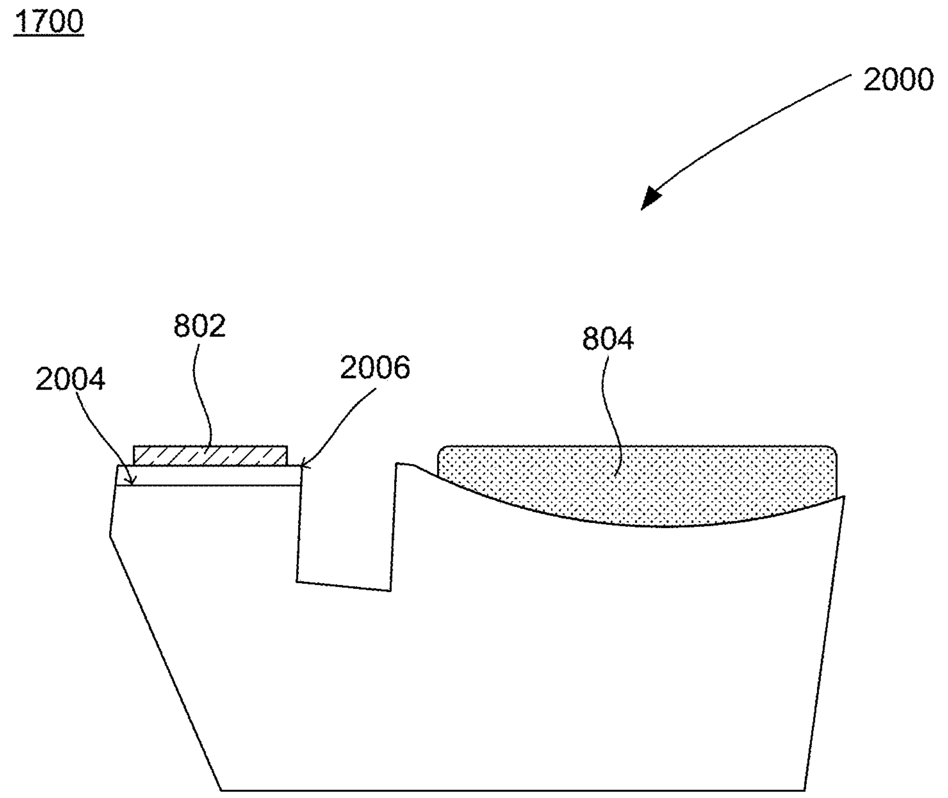
FIG. 16 is a second end view of a lubricating cartridge having a mounting section with shoulders, and showing a lubricant applicator and a mounting component installed thereto, according to an example embodiment.

FIG. 12, FIG. 13, FIG. 14, FIG. 15 illustrate a lubricating cartridge (2000) having a mounting section with shoulders (in this embodiment, shown at the first end section of the mounting section (2002) and the second end section of the mounting section (2004)). FIG. 16 is a second end view of a lubricating cartridge (2000) having a mounting section with shoulders, and showing a lubricant applicator (804) and a mounting component (802) installed thereto, according to an example embodiment. FIG. 17 is a second end view of a lubricating cartridge having a mounting section with shoulders showing an alternative lubricant applicator and a mounting component installed thereto, where the lubricant applicator (804) has a top surface and a bottom surface, and the top surface is concave. FIG. 18 is a perspective view of a lubricating cartridge (2000) having a mounting section with shoulders, and showing a lubricant applicator and a mounting component installed thereto, according to an example embodiment. It should be understood that another non-limiting embodiment could include just one shoulder.

FIG. 19 is a perspective view of a lubricating cartridge (3000) having a mounting section with shoulders, and showing plural lubricant applicators and a mounting component installed thereto, according to an example embodiment. FIG. 20 is an inside view of a lubricating cartridge (3500) having a mounting section with shoulders and a lubrication section having a gap barrier wall, according to an example embodiment. FIG. 21 is a perspective view of a lubricating cartridge 3500 having a mounting section with shoulders and a lubrication section having a gap barrier wall, and showing plural lubricant applicators and a mounting component installed thereto, according to an example embodiment.

FIG. 22, for example, illustrates a lubricating cartridge (4000) having a clamp-like structure according to an example embodiment. FIG. 23 is a lubricating cartridge (5000) having a reservoir according to an example embodiment.

In some embodiments, the mounting component includes a hinge pin. A hinge pin is a cylindrical rod or pin that serves as a central component in a hinge mechanism. It is responsible for holding the two hinge leaves together and enabling the rotational movement of the hinge. The hinge pin can run through two or more knuckles of the hinge leaves, allowing the door or the attached object to swing open and closed smoothly. The hinge pin can further operate as a pivot point, allowing the hinge leaves to rotate around it, thereby facilitating the movement of the door or object attached to the hinge. In some hinge designs, the hinge pin is designed to be removable, which can be useful for tasks such as installation, maintenance, or removal of the lubrication cartridge.

In some embodiments, the mounting component includes a clamp configured to securely clamp on the upper section and lower section of the hinge. In an example implementation, the mounting component is integrated into the lubricating cartridge and is equipped with a specialized clamp mechanism constructed to provide a secure and dependable grip on both the upper and lower sections of the hinge to which the lubricating cartridge is intended to be attached. This clamping feature ensures that the lubricating cartridge remains firmly affixed to the hinge, preventing any unintended dislodgment or movement that might otherwise occur during regular usage or other conditions. By encompassing both the upper and lower sections of the hinge, this clamp system offers comprehensive and balanced support, contributing to the stability of the lubricating cartridge installation. This enhanced stability further ensures consistent and effective lubrication application, as the cartridge remains accurately positioned even when the hinge undergoes movement or stress.

In yet other embodiments, the lubricating cartridge (100) includes a mounting component having a spring-loaded pin having a spring component that enables the pin to be (i) pushed downward and secured to one or more segments of the door hinge, or (ii) depressed down into a barrel of the door hinge and spring back up to release the mounting component from the one or more segments of the door hinge.

In some embodiments, the mounting section (110) includes an inner surface (112) designed to receive a mounting component (804) for secure attachment to the door hinge.

In some embodiments, the lubricating cartridge (e.g., FIG. 1, 100; FIG. 11, 1100; FIG. 12, 2000; FIG. 19, 3000; FIG. 20, 3500; FIG. 22, 4000; FIG. 23, 5000; FIG. 24, 6000) includes a lubricant applicator (804) configured to transport the lubricant to a contact surface of the door hinge.

In some embodiments, the design of the lubricating cartridge (e.g., FIG. 1, 100; FIG. 11, 1100; FIG. 12, 2000; FIG. 19, 3000; FIG. 20, 3500; FIG. 22, 4000; FIG. 23, 5000; FIG. 24, 6000) allows for a range of lubricant choices. These options encompass the inclusion of a liquid lubricant, with an example implementation being silicone. Alternatively, the lubricant option can take the form of a lubricating substance such as grease or even a solid lubricant, such as soap, graphite, Molybdenum Disulfide ($MoS2$), tungsten disulfide ($WS2$), Polytetrafluoroethylene (PTFE), boron nitride, white graphite (hexagonal boron nitride), ceramic-based lubricants, solid polymer lubricants, metallic soaps such as lithium stearate and calcium stearate, silver, silicon carbide, fluorinated polymers, and diamond-like carbon (DLC) (as discussed earlier). Moreover, the lubricating cartridge is designed to potentially incorporate a lubricant composed of diverse lubricating substances, including oil, grease, solid lubricants, synthetic materials, and combinations thereof (as specified in the preceding explanations).

In some embodiments, the barrier section (120) of the lubricating cartridge (e.g., FIG. 1, 100; FIG. 11, 1100; FIG. 12, 2000; FIG. 19, 3000; FIG. 20, 3500) is constructed to operate adaptively, functioning as a hinge under certain circumstances. In an example implementation, the barrier section (120) is formed to operate as an adaptive hinge.

An "adaptive hinge", as referred to herein, generally means a hinge formed to accommodate various door hinge geometries by adapting to different angles between a side plate and knuckles of the receiving door hinge. This improves alignment between the lubricant applicator and the door's hinge knuckles, allowing for a single lubricating cartridge design across various hinge sizes and designs. Additionally, it reduces torque resulting from misalignment between the hinge knuckle and the lubricant applicator, resulting in a more reliable connection between the mounting component and hinge plate. In an example implementation, the adaptive hinge is constructed as a "fold" also commonly known as a "living hinge." A living hinge is a thin, flexible section in a plastic component that allows it to bend or flex repeatedly without breaking. It is typically designed to provide a point of flexibility and movement in a plastic part, enabling it to function like a hinge.

In some embodiment, the lubricating cartridge (e.g., FIG. 1, 100; FIG. 11, 1100; FIG. 12, 2000; FIG. 19, 3000; FIG. 20, 3500) in various embodiments is structured so that the barrier section (120) is a rigid connector. A "rigid connector" as used herein, generally means a structural element that joins two sections or components in a fixed or immovable manner. Unlike a hinge, which allows for rotational movement, a rigid connector provides a solid and stable connection without any flexibility.

With reference to FIG. 12 and FIG. 20, In some embodiments, the lubricating cartridge (e.g., FIG. 1, 100; FIG. 11, 1100; FIG. 12, 2000; FIG. 19, 3000; FIG. 20, 3500) includes a lubrication section (130) comprising a first end collection well (132), a lubricant applicator compartment (134), and a second end collection well (136). The collection wells, as integrated within the described lubricating cartridge in certain implementations, serve the purpose of facilitating efficient management and distribution of the lubricant within the lubricating cartridge. Either or both of the first end collection wells act as initial reservoirs or storage areas for the lubricant. They serve to accumulate and retain a portion of the lubricant, which is initially placed or dispensed into the cartridge. These reservoirs ensure that an adequate amount of lubricant is available for application to the door hinge when needed.

The lubricant applicator compartment (134) acts as a conduit, channeling the collected lubricant from the collection wells towards the lubricant applicator (804). Thus, the lubricant applicator compartment (134) provides a controlled pathway for the lubricant to flow, ensuring a consistent and even distribution of the lubricant along a substantial portion of its length.

Depending on the orientation of the lubricating cartridge on the hinge, Either the first end collection well (132) or the second end collection well (136) can function as a terminal collection point. It captures any excess lubricant that may have flowed through the lubricant applicator compartment (134) but has not been utilized for application onto the hinge. This prevents wastage and ensures that any surplus lubricant is contained within the cartridge for future use. Overall, the collection wells, in conjunction with the lubricant applicator compartment, enable a regulated and controlled transfer of lubricant within the lubricating cartridge. This design promotes efficient lubrication application to the door hinge while also minimizing wastage and mess.

In some embodiments, the lubricating cartridge (100) includes a lubricant applicator (804) having a size corresponding to the lubricant applicator compartment (134) and configured to dispense the lubricant.

In some embodiments, the lubricating cartridge (100) further includes a lubricant applicator (804) constructed to substantially match the dimensions of the lubricant applicator compartment (134) and provide a controlled release of the lubricant when applied onto a surface of the door hinge. In an example implementation, the lubricant applicator (804) has a top surface and a bottom surface, and the top surface is concave.

In some embodiments, the lubricating cartridge (100) further comprises a first end collection well (132) arranged at a first end of the lubrication section (130), a second end collection well (136) arranged at a second end of the lubrication section (130), wherein the lubricant applicator compartment (134) is arranged between the first end collection well (132) and the second end collection well (136); a lubricant applicator (804) having a first end, a second end and a length approximately the length of (i) the first end collection well (132), (ii) the lubricant applicator compartment (134) and (iii) the second end collection well (136); and the first end of the lubricant applicator (804) is inserted into the first end collection well (132), and the second end of the lubricant applicator (804) inserted into the second end collection well (136).

Referring to FIG. 1, FIG. 9A, FIG. 9B, and FIG. 11, in some embodiments, a lubricating cartridge (1100) further comprises a first end collection well (1107) arranged at a first end of the lubrication section (130), a second end collection well (1113) arranged at a second end of the lubrication section (130), a first end channel (1104), a second end channel (1110), where the first end channel (1104) is arranged between the first end collection well (1107) and a first end of the lubricant applicator compartment (134), and the second end channel (1110) is arranged between the second end collection well (1113) and a second end of the lubricant applicator compartment (134); and a lubricant applicator (804) having a first end, a second end and a length approximately the length of the lubricant applicator compartment (134); and where the lubricant applicator (804) is inserted into the lubricant applicator compartment (134).

Referring to FIG. 13, FIG. 14, FIG. 15, FIG. 16, FIG. 17 and FIG. 18, in some embodiments, a lubricating cartridge (2000) includes a mounting section that comprises a first end section (2002), a second end section (2004) and a mounting section midsection (2006) wherein the first end section (2002) and the second end section (2004) step down from the mounting section midsection (2006) of the mounting section. The "step down" from the mounting section midsection (2006) to either the first end section (2002) and the second end section (2004) can also be analogously described as forming "shoulders." These step downs (or shoulders) serve the in the lubricating cartridge's operation by preventing the unintended transfer of lubricant to the mounting applicator. The step downs can operate in conjunction with the barrier section (120).

By having the first end section (2002) and the second end section (2004) stepped down or shouldered from the mounting section midsection (2006), lubricant that is on door hinge or otherwise passes the barrier section (120) is prevented from migrating onto to the mounting applicator.

In some embodiments, the mounting section (110) comprises a mounting component (802) affixed to the mounting section midsection (2006) and for mounting onto the door hinge.

In some embodiments, the lubricating cartridge (100) further comprises a plurality of lubricant applicators inserted into the lubricant applicator compartment (134).

In yet other embodiments, the lubrication section (134) further comprises a gap barrier wall (3004).

Referring to FIG. 20 and FIG. 21, in yet other embodiments, the lubrication section (134) further comprises a first end lubricant applicator (804A); a second end lubricant applicator (804B); the lubrication section including: a first end lubricant applicator compartment (134A), a second end lubricant applicator compartment (134B), and a gap barrier wall (3004); and the first end lubricant applicator (804A) is installed into the first end lubricant applicator compartment (134A) and the second end lubricant applicator (804B) is installed into the second end lubricant applicator compartment (134B). First end lubricant applicator (804A) and second end lubricant applicator (804B) can collectively be referred to simply as lubricant applicator 804 and first end lubricant applicator compartment (134A) and second end lubricant applicator compartment (134B) can collectively be referred to simply as lubricant applicator compartment 134.

In some embodiments, the lubricating cartridge (e.g., FIG. 20 and FIG. 21, 3500) further comprises: a gap (3002) having a first section (3002*a*) and a second section (3002*b*), wherein the gap barrier wall (3004) is positioned between the first section (3002*a*) and the second section (3002*b*). In an example implementation, the lubrication section (130) further comprising a midsection (3006) covering the gap barrier wall (3004) and at least a portion of both the first section (3002*a*) and the second section (3002*b*).

In some embodiments, the lubricating cartridge (e.g., FIG. 1, 100; FIG. 11, 1100; FIG. 12, 2000; FIG. 19, 3000; FIG. 20, 3500; FIG. 22, 4000; FIG. 23, 5000; FIG. 24, 6000) further comprises: an indicator element, the indicator element providing visual feedback to indicate the presence of the lubricant. In an example implementation, a transparent window or compartment incorporated into the lubricating cartridges outer casing is provided. This window can, for example, contain a strip or patch of material that is sensitive to the presence of lubricant. When the lubricant is present in sufficient quantities within the cartridge, the indicator material changes color. This color change is visible through the transparent window, providing a clear visual indication that the lubricant is present and available for use. In a non-limiting example, the indicator material can start off as green. As the lubricant is dispensed onto the door hinge, the indicator material gradually changes from green to a contrasting color, such as red. This color change occurs due to the chemical interaction between the lubricant and the indicator material.

Other visual feedback mechanisms can be used as well to enhance user convenience and help ensure that the lubricating cartridge is properly loaded and ready to provide lubrication when applied to the door hinge.

In some embodiments, the mounting component is selected from a group consisting of a capacitive coupling and an inductive coupling, wherein the mounting component is configured to create a temporary electrical connection or coupling between two components without physically affixing them together.

FIG. 24, FIG. 25, and FIG. 26 illustrate a lubricating cartridge (6000) with lubricant applicator compartments and mounting component compartments configured in a linear alignment, according to an example embodiment. The lubricant applicator compartments and mounting component compartments are arranged so that when the lubricating cartridge is installed onto a hinge, the corresponding mounting components position lubricant applicators (804A, 804B, 804C) over the knuckle interfaces of the hinge.

FIG. 24 is a perspective view and assembly view of a lubricating cartridge having lubricant applicator compartments and mounting component compartments configured in a linear alignment according to an example embodiment.

FIG. 25 are various views of a lubricating cartridge having lubricant applicator compartments and mounting component compartments configured in a linear alignment according to an example embodiment. Particularly, FIG. 25 illustrates a first hinge side view (6100) of a main body (6002) of the lubricating cartridge (6000) without any lubricant applicator or mounting component installed. FIG. 25 also illustrates a second hinge side view (6110) of the main body (6002) of the lubricating cartridge (6000) with lubricant applicators (804A, 804B, 804C) and mounting components (802A, 802B) installed. Either hinge side view can also be referred to as an inside view. FIG. 25 also illustrates a side view (6110) of the main body (6002) of the lubricating cartridge (6000) with lubricant applicators (804A, 804B, 804C) and mounting components (802A, 802B) installed. Either hinge side view can also be referred to as an inside view. FIG. 25 also illustrates a cross section (6120) of the main body (6002) of the lubricating cartridge (6000) with lubricant applicators (804A, 804B, 804C) and mounting components (802A, 802B) installed. FIG. 25 also illustrates a side (6130) of the main body (6002) of the lubricating cartridge (6000) with lubricant applicators (804A, 804B, 804C) and mounting components (802A, 802B) installed. FIG. 25 also illustrates an outside view (6140) of the main body (6002) of the lubricating cartridge (6000). FIG. 25 also illustrates first end view (6150) of the main body (6002) of the lubricating cartridge (6000), particularly showing a first lubricant applicator (804A) as it would appear from this view. FIG. 25 also illustrates first end cross section view (6160) of the main body (6002) of the lubricating cartridge (6000) particularly showing a cross section of the first lubricant applicator compartment (FIG. 24, 134A) with the first lubricant applicator (804A) installed. FIG. 25 also illustrates second end view (6170) of the main body (6002) of the lubricating cartridge (6000), particularly showing a third lubricant applicator (804C) as it would appear from this view. FIG. 25 also illustrates second end cross section view (6180) of the main body (6002) of the lubricating cartridge (6000) particularly showing a cross section of the third lubricant applicator compartment (FIG. 24, 134C) with the third lubricant applicator (804C) installed.

FIG. 25 also illustrates a top surface (804) of a lubricant applicator (804A, 804B, 804C) and a bottom surface (805) of the lubricant applicator (804A, 804B, 804C).

FIG. 26 illustrates various features of a lubricating cartridge having lubricant applicator compartments and mounting component compartments configured in a linear alignment according to an example embodiment.

The lubricating cartridge (6000) comprises a lubrication section and a mounting section. Generally, the lubrication section contains the lubricant applicator compartments and is responsible for storing and applying lubricant correctly through the applicators. The mounting section contains the mounting component compartments and securely attaches the lubricating cartridge (6000) to a door hinge or other mounting surface. In this implementation, the lubrication section includes multiple subsections, such as a first lubrication section (130A), a second lubrication section (130B), and a third lubrication section (130C), collectively referred to as lubrication section (130). Similarly, the mounting section includes multiple subsections, such as a first mounting section (110A) and a second mounting section (110B), collectively referred to as mounting section (110).

Referring to FIG. 24, in the example implementation, the lubricating cartridge (6000) includes a first lubricant applicator compartment (134A), a second lubricant applicator compartment (134B), and a third lubricant applicator compartment (134C). Each lubricant applicator compartment acts as a reservoir. In other words, each lubricant applicator compartment functions as a global well containing lubricant in addition to holding a lubricant applicator. In some embodiments, the lubricant applicator compartments may also include smaller local wells (described in more detail below).

In some embodiments, the lubricating cartridge (6000) includes a first lubricant applicator (804A), a second lubricant applicator (804B), and a third lubricant applicator (804C). Each applicator applies lubricant to the door hinge by releasing the lubricant when compressed against the hinge knuckles. The lubricant applicators conform to the curvature of the knuckles, ensuring even lubricant distribution around their circumference.

The mounting section (110), in some embodiments, includes one or more mounting component compartments. These mounting component compartments are designed to receive the mounting components, to provide alignment and stability when installed. Referring to the example embodiment shown in FIG. 24, the lubricating cartridge (6000) further includes a first mounting component compartment (6004A) and a second mounting component compartment (6004B). Each mounting component compartments are constructed to receive the mounting components. In the example embodiment shown in FIG. 24, FIG. 25, and FIG. 26, the lubricating cartridge (6000) further includes a first mounting component (802A) and a second mounting component (802B). They fit into corresponding mounting component compartments (6004A, 6004B) within the lubricating cartridge (6000). Each mounting component secures the lubricating cartridge (6000) to the door hinge or another mounting surface.

The lubricant applicator compartments (134A, 134B, 134C) and the mounting component compartments (6004A, 6004B) are arranged so that when the lubricating cartridge (6000) is enabled to be installed onto a hinge such that the corresponding mounting components (802A, 802B) position the lubricant applicators (804A, 804B, 804C) over the knuckle interfaces of the hinge.

In some embodiments, the lubricating cartridge (6000) also includes on or more lubricant applicator barriers positioned between each lubricant applicator. These lubricant applicator barriers prevent lubricant migration to one end of the lubricating cartridge (6000), allowing for efficient application and containment. Referring to FIG. 26, in an example embodiment, the lubricating cartridge (6000) further includes a first lubricant applicator barrier (6022A) and a second lubricant applicator barrier 6022B). Each lubricant applicator barrier is located so as to separate each lubricant applicator (804A, 804B, 804C), substantially preventing the lubricant from migrating to one end of the lubricating cartridge (6000) when installed on a hinge. This allows the lubricant to be substantially contained and applied efficiently. In this embodiment, each lubricant applicator barrier (6022A, 6022B) includes a mounting component compartment (6004A, 6004B) designed to receive the one or more corresponding mounting components (802A, 802B).

In some embodiments, the lubricating cartridge (6000) includes one or more local wells (6010, 6012) within the lubricant applicator compartments (134A, 134B, 134C). These local wells hold lubricant and distribute it to the applicators (e.g., through capillary action), ensuring even saturation and containment. Each local well features a barrier wall (6011, 6013) that prevents the lubricant from migrating out, enhancing the structural integrity of the compartments and the main body (6002) of the cartridge. Local wells can be configured in patterns such as a grid, and they may be cylindrical or slightly tapered.

The local wells contribute to the overall structural integrity of the lubricating cartridge main body (6002), supporting and stabilizing it when the lubricant applicators (804A, 804B, 804C) are inserted. They also assist in the even distribution of lubricant across the applicators, preventing concentration in any single area.

By integrating with the lubricant applicator compartments (134A, 134B, 134C) and mounting component compartments (6004A, 6004B), the local wells reinforce the framework, helping to prevent deformation under pressure and maintaining the lubricating cartridge's structural integrity. They also play a role in containing the lubricant, reducing leakage risk by holding the lubricant in controlled areas.

The design of the local wells ensures consistent application of the lubricant. As the sponge interacts with these wells, lubricant is distributed uniformly, reducing the risk of over-saturation or under-supply and extending the lubricating cartridge's service life.

In the implementations shown in FIG. 24, FIG. 25, and FIG. 26, each local well includes a barrier wall, such as (6011) for well (6010) and (6013) for well (6012).

Overall, the local wells enhance the stability of the lubricant applicators, reinforce the compartments, ensure effective containment, and facilitate even lubricant distribution.

For clarity, not all local wells are labeled, and the shape of each local well can vary.

In some embodiments, the lubricating cartridge (6000) features a main body (6002) that houses one or more lubricant applicators and mounting component, and contains the lubricant, facilitating the installation and operation of the lubrication system. In an example embodiment, the linear alignment of the compartments follows a sequence in which the one or more lubricant applicator compartments (134A, 134B, 134C) in the lubrication section (130) alternate with the one or more mounting component compartments (6004A, 6004B) in the mounting section (110), creating a continuous, alternating pattern of lubricant applicator and mounting component compartments. In some embodiments, the linear alignment of the compartments follows a sequence in which the one or more lubricant applicator compartments (134A, 134B, 134C) in the lubrication section (130) alternate with the one or more lubricant applicator barriers (6022A, 6022B), creating a continuous, alternating pattern of lubricant applicator and lubricant applicator barriers.

In some embodiments, each of the lubricant applicator compartments (134A, 134B, 134C) has multiple smaller local wells (6010, 6012) within it such that when a lubricant applicator is inserted into a lubricant applicator compartment, a bottom surface (805) of the lubricant applicator (804A, 804B, 804C) is seated over a local well (6010, 6012) and a top surface (803) of the lubricant applicator extends above the corresponding lubricant applicator compartment (134A, 134B, 134C).

In some embodiments, the lubricant applicator compartments are designed to press-fit the corresponding lubricant applicator, securing it in place to prevent it from falling out. In some embodiments, instead of containing lubricant, a local well (6010, 6012) can be used to hold adhesive material. This adhesive can affix the main body (6002) to the bottom surface (805) of the lubricant applicators (804A, 804B, 804C). For instance, the local wells could be pre-filled with a pressure-sensitive adhesive that bonds when the applicators are pressed into place. Alternatively, a heat-activated adhesive could be deposited in the wells, which cures when heat is applied during assembly. Other known methods of adhering can be used as well. By containing the adhesive within specific wells, the design ensures that the applicators remain securely attached, maintaining proper alignment and structural integrity. For example, local well (6010) could be configured to hold adhesive that bonds the main body (6002) to the corresponding lubricant applicator (804A), ensuring a secure connection. When a local well is used to contain adhesive instead of lubricant, it can also be referred to as an adhesive pocket.

Referring to FIG. 26, in some embodiments, the lubricating cartridge (6000) includes a trough (6018) on the hinge-facing side of the main body (6002). The trough, which functions as a channel, is formed to collect at least some of any lubricant that leaks from one or more lubricant applicator compartments (134A, 134B, 134C). This feature helps contain any excess lubricant, preventing it from spreading onto the outer walls of the main body (6002) and ensuring that the lubricant remains effectively within the intended application area.

In some embodiments, the lubricant applicators are pre-loaded with a specific amount of lubricant, so that the majority of the lubricant is stored within the applicators, while any excess lubricant flows into the lubricant applicator compartments.

Together, the above-described components create an efficient system for storing, containing, and applying lubricant to door hinges, preventing leakage and ensuring even distribution across the hinge surfaces.

Figure 10A:
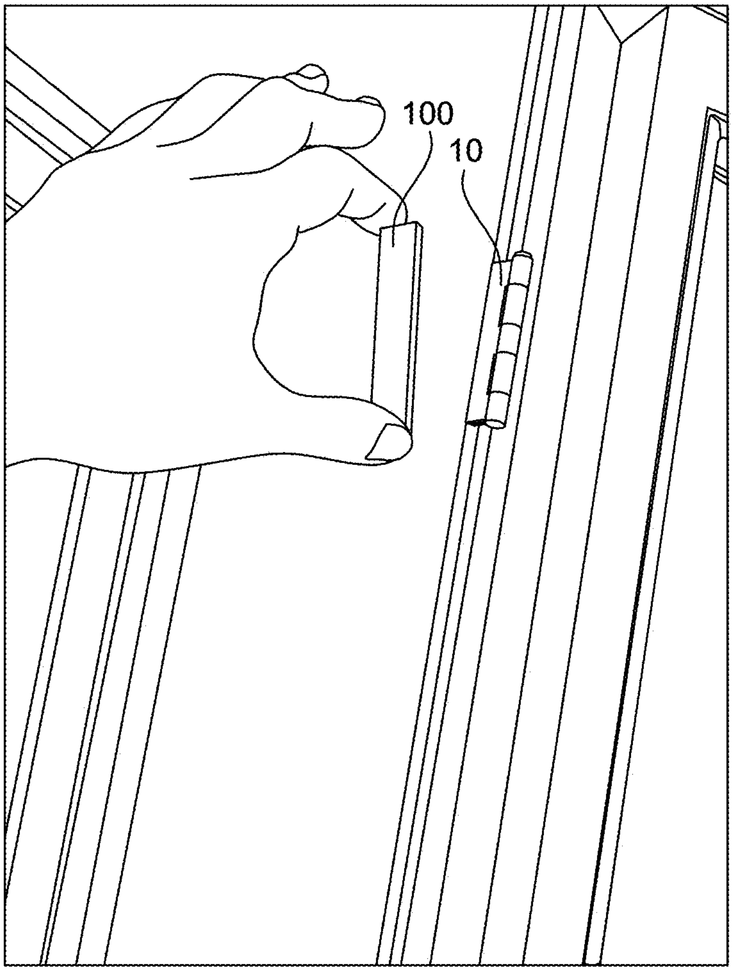
FIG. 10A illustrates a method for mounting a lubricating cartridge to a hinge, according to an example embodiment.
Figure 10B:
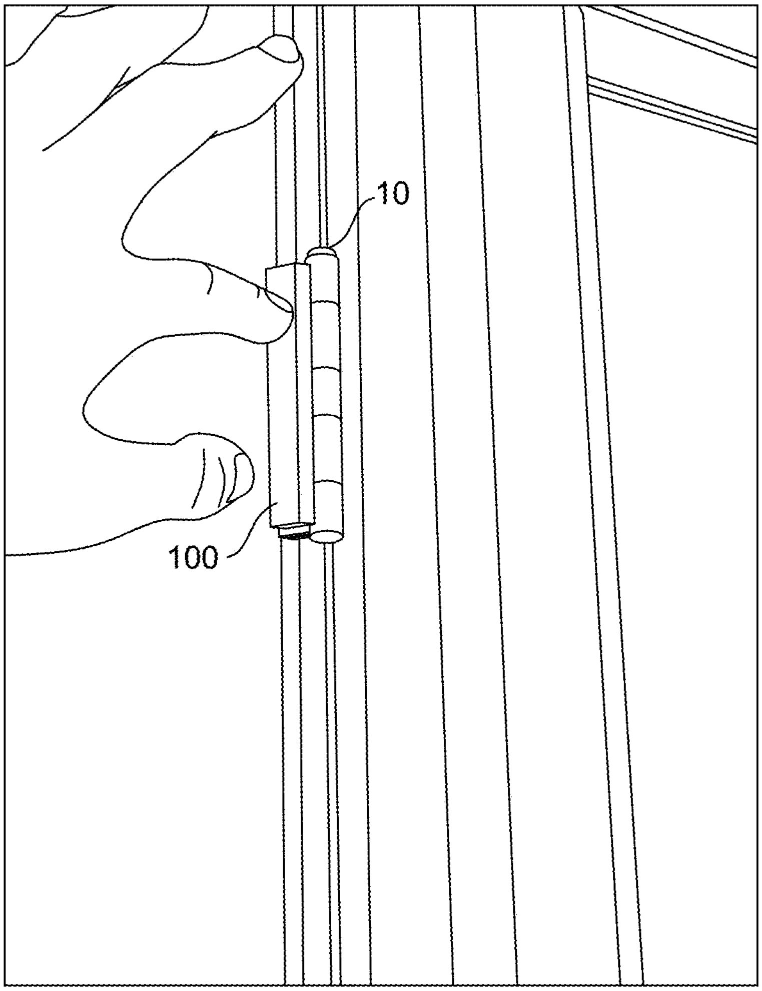
FIG. 10B illustrates a method for mounting a lubricating cartridge to a hinge, according to an example embodiment.
Figure 10C:
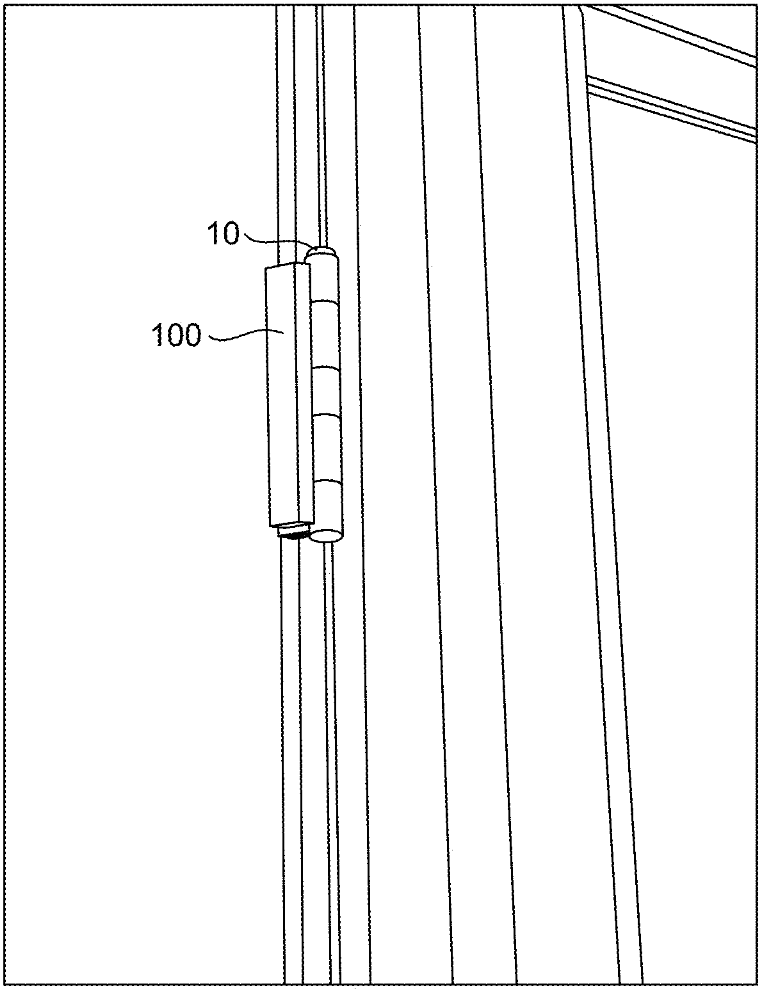
FIG. 10C illustrates a lubricating cartridge mounted to a hinge, according to an example embodiment.

In another aspect, a hinge-lubricating system is provided. The hinge-lubricating system includes any of the lubricating cartridges (100, 1100, 2000, 3000, 3500, 4000, 5000, 6000) described herein and a door hinge 10, as illustrated in FIG. 10A, FIG. 10B, FIG. 10C.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

Additional Clauses. The following are additional clauses relative to the present disclosure, which could be combined and/or otherwise integrated with any of the embodiments described above or listed in the claims below.

Clause 1. A lubricating cartridge (100, 1100, 2000, 3000, 3500, 4000, 5000, 6000), comprising:
- a lubrication section (130) comprising a compartment for containing a lubricant; and
- a mounting section (110) coupled to the lubrication section (130) and configured to mount onto a door hinge.

Clause 2. A lubricating cartridge (100, 1100, 2000, 3000, 3500, 4000, 5000, 6000), comprising:
- a lubrication section (130) comprising a compartment for containing a lubricant; and
- a mounting section (110) coupled to the lubrication section (130) and configured to mount adjacent to a door hinge.

Clause 3. A lubricating cartridge (100, 1100, 2000, 3000, 3500, 4000, 5000), comprising:
- a lubrication section (130) comprising a compartment for containing a lubricant; and
- a mounting section (110) coupled to the lubrication section (130) and configured to mount onto or adjacent to a door hinge.

Clause 4. The lubricating cartridge (100, 1100, 2000, 3000, 3500, 4000, 5000, 6000) according to any one of clauses 1 to 3, further comprising:
- a barrier section (120) positioned between to the mounting section (110) and the lubrication section (130), the barrier section (120) configured to inhibit transfer of the lubricant to the mounting section (110).

Clause 5. The lubricating cartridge (100, 1100, 2000, 3000, 3500, 4000, 5000, 6000) according to clause 4, wherein the barrier section (120) comprises any one or a combination of: a wiper, a sponge, and a gap.

Clause 6. The lubricating cartridge (100, 1100, 2000, 3000, 3500, 4000, 5000, 6000) according to clause 4, wherein the barrier section (120) comprises a gap positioned between the mounting section (110) and the lubrication section (130), said gap configured to inhibit transfer of the lubricant to the mounting section (110).

Clause 7. The lubricating cartridge (100, 1100, 2000, 3000, 3500, 4000, 5000, 6000) according to any one of clauses 1 to 6, further comprising:
- a lubricant formulated to provide lubrication to the door hinge.

Clause 8. The lubricating cartridge (100, 1100, 2000, 3000, 3500, 4000, 5000, 6000) according to any one of clauses 1 to 7, wherein the mounting section (110) comprises a mounting component (802) for mounting onto the door hinge.

Clause 9. The lubricating cartridge (100, 1100, 2000, 3000, 3500, 4000, 5000, 6000) according to clause 8, wherein the mounting component is selected from a group consisting of one or more threaded connectors, one or more snap-fit attachments, one or more adhesive elements, one or more suction cups, one or more magnets, and one or more clamping structures.

Clause 10. The lubricating cartridge (100, 1100, 2000, 3000, 3500, 4000, 5000, 6000) according to clause 8, wherein the mounting component includes a hinge pin.

Clause 11. The lubricating cartridge (100, 1100, 2000, 3000, 3500, 4000, 5000, 6000) according to clause 8, wherein the mounting component includes a clamp configured to securely clamp on to an upper section and a lower section of the hinge.

Clause 12. The lubricating cartridge (100, 1100, 2000, 3000, 3500, 4000, 5000, 6000) according to clause 8, wherein the mounting component includes a spring-loaded pin having a spring component that enables the pin to be (i) pushed downward and secured to secure to one or more segments of the door hinge, or (ii) depressed down into a barrel of the door hinge and spring back up when released to release the mounting component from the one or more segments of the door hinge.

Clause 13. The lubricating cartridge (100, 1100, 2000, 3000, 3500, 6000) of clause 8, wherein the mounting section (110) includes an inner surface (112) designed to receive a mounting component (802) for secure attachment to the door hinge.

Clause 14. The lubricating cartridge (100, 1100, 2000, 3000, 3500, 4000, 5000, 6000) according to any one of clauses 1 to 13, further comprising:

a lubricant applicator (804) configured to transport the lubricant to a contact surface of the door hinge.

Clause 15. The lubricating cartridge (100, 1100, 2000, 3000, 3500, 4000, 5000, 6000) according to any one of clauses 1 to 14, wherein the lubricant comprises a liquid lubricant.

Clause 16. The lubricating cartridge (100, 1100, 2000, 3000, 3500, 4000, 5000, 6000) according to any one of clauses 1 to 15, the liquid lubricant is silicone.

Clause 17. The lubricating cartridge (100, 1100, 2000, 3000, 3500, 4000, 5000, 6000) according to any one of clauses 1 to 14, wherein the lubricant is a grease.

Clause 18. The lubricating cartridge (100, 1100, 2000, 3000, 3500, 4000, 5000, 6000) according to any one of clauses 1 to 14, wherein the lubricant is a solid lubricant.

Clause 19. The lubricating cartridge (100, 1100, 2000, 3000, 3500, 4000, 5000, 6000) according to any one of clauses 1 to 14, wherein the lubricant comprises a lubricating substance selected from a group consisting of an oil, a grease, a solid lubricant, a synthetic material, and combinations thereof.

Clause 20. The lubricating cartridge (100, 1100, 2000, 3000, 3500, 6000) according to any one of clauses 1 to 19, wherein the barrier section (120) is configured operate as an adaptive hinge.

Clause 21. The lubricating cartridge (100, 1100, 2000, 3000, 3500, 6000) according to any one of clauses 1 to 19, wherein the barrier section (120) is constructed to function as a rigid connector.

Clause 22. The lubricating cartridge (100, 1100, 2000, 3000, 3500, 4000, 5000, 6000) according to any one of clauses 1 to 21, wherein the lubrication section (130) comprises:

a first end collection well (132);

a lubricant applicator compartment (134); and a second end collection well (136).

Clause 23. The lubricating cartridge (100, 1100, 2000, 3000, 3500, 4000, 5000, 6000) according to any one of clauses 1 to 22, further comprising:

a lubricant applicator (804) having a size corresponding to the lubricant applicator compartment (134) and configured to dispense the lubricant.

Clause 24. The lubricating cartridge (100, 1100, 2000, 3000, 3500, 4000, 5000, 6000) according to any one of clauses 1 to 22, further comprising:

the lubricant applicator compartment having a plurality of sections having a plurality of corresponding dimensions, correspondingly; and a lubricant applicator (804) constructed to substantially match the plurality of dimensions of the lubricant applicator compartment (134) and provide a controlled release of the lubricant when applied onto a surface of the door hinge.

Clause 25. The lubricating cartridge (100, 1100, 2000, 3000, 3500, 4000, 5000, 6000) according to any one of clauses 14 to 24, wherein the lubricant applicator (804) has a top surface and a bottom surface, and the top is concave.

Clause 26. The lubricating cartridge (100, 1100, 2000, 3000, 3500, 4000, 5000, 6000) according to any one of clauses 1 to 25, further comprising:

a first end collection well (132) arranged at a first end of the lubrication section (130), a second end collection well (136) arranged at a second end of the lubrication section (130), wherein the lubricant applicator compartment (134) is arranged between the first end collection well (132) and the second end collection well (136);

a lubricant applicator (804) having a first end, a second end and a length approximately the length of (i) the first end collection well (132), (ii) the lubricant applicator compartment (134) and (iii) the second end collection well (136); and wherein the first end of the lubricant applicator (804) is inserted into the first end collection well (132), and the second end of the lubricant applicator (804) inserted into the second end collection well (136).

Clause 27. The lubricating cartridge (100, 1100, 2000, 3000, 3500, 4000, 5000, 6000) according to any one of clauses 1 to 25, further comprising:

a first end collection well (1107) arranged at a first end of the lubrication section (130), a second end collection well (1113) arranged at a second end of the lubrication section (130), a first end channel (1104), a second end channel (1110), wherein the first end channel (1104) is arranged between the first end collection well (1107) and a first end of the lubricant applicator compartment (134), and wherein the second end channel (1110) is arranged between the second end collection well (136) and a second end of the lubricant applicator compartment (134);

a lubricant applicator (804) having a first end, a second end and a length approximately the length of the lubricant applicator compartment (134); and wherein the lubricant applicator (804) is inserted into the lubricant applicator compartment (134).

Clause 28. The lubricating cartridge (100, 1100, 2000, 3000, 3500, 6000) according to any one of clauses 1 to 27, wherein the mounting section comprises a mounting section first end section (2002), a mounting section second end section (2004) and a mounting section midsection (2006) wherein the mounting section first end section (2002) and the mounting section second end section (2004) step down from the mounting section midsection (2006).

Clause 29. The lubricating cartridge (100, 1100, 2000, 3000, 3500, 6000) according to clause 28, wherein the mounting section (110) comprises a mounting component (802) affixed to the midsection (2006) and for mounting onto the door hinge.

Clause 30. The lubricating cartridge (100, 1100, 2000, 3000, 3500, 4000, 5000, 6000) according to any one of clauses 1 to 29, comprising:

a plurality of lubricant applicators inserted into the lubricant applicator compartment (134).

Clause 31. The lubricating cartridge (3500) according to any one of clauses 1 to 30, wherein the lubrication section (134) further comprises a gap barrier wall (3004).

Clause 32. The lubricating cartridge (3500) according to any one of clauses 1 to 30, further comprising:

a first end lubricant applicator (804*a*);

a second end lubricant applicator (804*b*);

the lubrication section including:

a first end lubricant applicator compartment (134*a*), a second end lubricant applicator compartment (134*b*), and a gap barrier wall (3004); and wherein the first end lubricant applicator (804A) is installed into the first end lubricant applicator compartment (134A) and the second end lubricant applicator (804B) is installed into the second end lubricant applicator compartment (134B).

Clause 33. The lubricating cartridge (3500) according to clause 32, further comprising: a gap (3002) having a first section (3002*a*) and a second section (3002*b*), wherein the gap barrier wall (3004) is positioned between the first section (3002*a*) and the second section (3002*b*).

Clause 34. The lubricating cartridge (3500) according to clause 33, the lubrication section (130) further comprising a midsection (3006) covering the gap barrier wall (3004) and at least a portion of both the first section (3002*a*) and the second section (3002*b*).

Clause 35. The lubricating cartridge (100, 1100, 2000, 3000, 3500, 4000, 5000, 6000) according to any one of clauses 1 to 34, further comprising:

an indicator element adapted to provide a visual feedback indicating a presence of the lubricant.

Clause 36. The lubricating cartridge (100, 1100, 2000, 3000, 3500, 4000, 5000, 6000) according to any one of clauses 1 to 34, wherein the mounting component is selected from a group consisting of a capacitive coupling and an inductive coupling, wherein the mounting component is configured to create a temporary electrical connection or coupling between two components without physically affixing them together.

Clause 37. A hinge-lubricating system comprising:

the lubricating cartridge (100, 1100, 2000, 3000, 3500, 4000, 5000, 6000) according to any one of clauses 1-36; and a door hinge (10).

What is claimed is:

1. A lubricating cartridge, comprising:

a lubrication section comprising a lubricant applicator compartment constructed to receive a lubricant applicator;

a mounting section comprising a mounting component compartment constructed to receive a mounting component, the mounting component configured to detachably and re-attachably mount onto a door hinge; and one or more local wells within the lubricant applicator compartment such that the lubricant applicator compartment forms a global well surrounding a portion of a lubricant applicator, such that when the lubricant applicator is inserted into the lubricant applicator compartment, a bottom surface of the lubricant applicator is seated over a local well and a top surface of the lubricant applicator extends above the corresponding lubricant applicator compartment.

2. The lubricating cartridge according to claim 1, wherein the lubricant applicator is configured to transport a lubricant to the door hinge.

3. The lubricating cartridge according to claim 2, wherein the lubricant comprises a liquid lubricant.

4. The lubricating cartridge according to claim 3, wherein the liquid lubricant is silicone.

5. The lubricating cartridge according to claim 1, wherein the mounting component is selected from a group consisting of one or more threaded connectors, one or more snap-fit attachments, one or more adhesive elements, one or more suction cups, one or more magnets, and one or more clamping structures.

6. The lubricating cartridge according to claim 1, wherein the mounting section includes an inner surface designed to receive the mounting component for secure attachment to the door hinge.

7. The lubricating cartridge according to claim 1, wherein the lubricant applicator is configured to transport a lubricant to a contact surface of the door hinge.

8. The lubricating cartridge according to claim 1, wherein the lubrication section comprises:

a first end collection well; and a second end collection well.

9. The lubricating cartridge according to claim 8, further comprising:

the lubricant applicator compartment having a plurality of sections, each of the plurality of sections having a corresponding dimension; and a plurality of lubricant applicators, each of the plurality of lubricant applicators constructed to substantially match the dimension of a corresponding section of the plurality of sections of the lubricant applicator compartment and to provide a controlled release of a lubricant when applied onto a surface of the door hinge.

10. The lubricating cartridge according to claim 1, comprising:

a plurality of lubricant applicators inserted into the lubricant applicator compartment.

11. The lubricating cartridge according to claim 1, wherein the lubrication section includes a plurality of lubricant applicator compartments, each of the plurality of lubricant applicator compartments constructed to receive a corresponding one of the plurality of lubricant applicators; and wherein the mounting section includes a plurality of mounting component compartments, each of the plurality of mounting component compartments constructed to receive a corresponding one of the plurality of mounting components.

12. The lubricating cartridge of claim 11, wherein the plurality of lubricant applicator compartments and the plurality of mounting component compartments are configured in a linear alignment.

13. The lubricating cartridge of claim 1, further comprising:

a trough formed on a hinge-facing side of a main body of the lubricating cartridge, the trough configured to collect at least some lubricant that leaks outside of any one of the one or more lubricant applicator compartments.

14. The lubricating cartridge of claim 1, further comprising:

a first lubricant applicator barrier and a second lubricant applicator barrier, each located to separate the one or more lubricant applicators and substantially prevent lubricant migration to one end of the lubricating cartridge when installed on a hinge.

15. The lubricating cartridge of claim 14, wherein the mounting component compartment comprises a first mounting component compartment and a second mounting component compartment, the mounting component comprises a first mounting component and a second mounting component, and the first lubricant applicator barrier includes the first mounting component compartment and the second lubricant applicator barrier includes the second mounting component compartment.

16. The lubricating cartridge of claim 1, further comprising:

one or more local wells formed on a main body of the lubricating cartridge and configured to hold adhesive material, wherein the adhesive material is used to affix the main body of the lubricating cartridge to a bottom surface of the lubricant applicator.

17. The lubricating cartridge of claim 1, further comprising:

a mounting component installed within the mounting component compartment; and a lubricant applicator inserted into the lubricant applicator compartment.

18. A lubricating cartridge, comprising:

a lubrication section comprising a lubricant applicator compartment constructed to receive a lubricant applicator;

a mounting section comprising a mounting component compartment constructed to receive a mounting component, the mounting component configured to detachably and re-attachably mount onto a door hinge; and a trough formed on a hinge-facing side of a main body of the lubricating cartridge, the trough configured to collect at least some lubricant that leaks outside of the lubricant applicator compartment.

19. The lubricating cartridge of claim 18, further comprising:

a mounting component installed within the mounting component compartment; and a lubricant applicator inserted into the lubricant applicator compartment.

20. A lubricating cartridge, comprising:

a lubrication section comprising a lubricant applicator compartment constructed to receive a lubricant applicator;

a mounting section comprising a mounting component compartment constructed to receive a mounting component, the mounting component configured to detachably and re-attachably mount onto a door hinge; and a first lubricant applicator barrier and a second lubricant applicator barrier, each located to separate the one or more lubricant applicators and substantially prevent lubricant migration to one end of the lubricating cartridge when installed on the door hinge.

21. The lubricating cartridge of claim 20, further comprising:

a mounting component installed within the mounting component compartment; and a lubricant applicator inserted into the lubricant applicator compartment.

22. The lubricating cartridge of claim 21, wherein the mounting component compartment comprises a first mounting component compartment and a second mounting component compartment, the mounting component comprises a first mounting component and a second mounting component, and the first lubricant applicator barrier includes the first mounting component compartment and the second lubricant applicator barrier includes the second mounting component compartment.

23. A lubricating cartridge, comprising:

a lubrication section comprising a lubricant applicator compartment constructed to receive a lubricant applicator;

a mounting section comprising a mounting component compartment constructed to receive a mounting component, the mounting component configured to detachably and re-attachably mount onto a door hinge; and one or more local wells formed on a main body of the lubricating cartridge and configured to hold adhesive material, wherein the adhesive material is used to affix the main body of the lubricating cartridge to a bottom surface of a lubricant applicator.

24. The lubricating cartridge of claim 23, further comprising:

a mounting component installed within the mounting component compartment; and a lubricant applicator inserted into the lubricant applicator compartment.

* * * * *